(12) United States Patent
Su

(10) Patent No.: US 11,192,190 B2
(45) Date of Patent: Dec. 7, 2021

(54) BLADE ATTACHMENT-DETACHMENT ASSISTING APPARATUS

(71) Applicant: DISCO CORPORATION, Tokyo (JP)

(72) Inventor: Zhibo Su, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/872,905

(22) Filed: May 12, 2020

(65) Prior Publication Data

US 2020/0361006 A1 Nov. 19, 2020

(30) Foreign Application Priority Data

May 13, 2019 (JP) .............................. JP2019-090878

(51) Int. Cl.
| | |
|---|---|
| *B23B 31/06* | (2006.01) |
| *B27B 5/32* | (2006.01) |
| *B23B 31/18* | (2006.01) |
| *B25B 33/00* | (2006.01) |
| *B24B 45/00* | (2006.01) |
| *B23B 31/12* | (2006.01) |

(52) U.S. Cl.
CPC .............. *B23B 31/06* (2013.01); *B23B 31/18* (2013.01); *B27B 5/32* (2013.01); *B23B 31/1261* (2013.01); *B24B 45/003* (2013.01); *B25B 33/005* (2013.01); *Y10T 279/182* (2015.01); *Y10T 279/3431* (2015.01); *Y10T 483/174* (2015.01)

(58) Field of Classification Search
CPC ..... B23B 31/06; B23B 31/1261; B23B 31/18; B24B 45/003; B27B 5/32; Y10T 279/182; Y10T 279/3431; Y10T 483/174
See application file for complete search history.

(56) References Cited

U.S. PATENT DOCUMENTS 2,613,943 A * 10/1952 Trudeau .................. B23B 31/18
279/106
4,604,787 A *  8/1986 Silvers, Jr. ......... B23Q 3/15553
483/55
(Continued)

FOREIGN PATENT DOCUMENTS

DE         3532903 A1 *  3/1987 ........... B24B 45/003
JP     2004281700 A    10/2004
(Continued)

*Primary Examiner* — Eric A. Gates
(74) *Attorney, Agent, or Firm* — Greer Burns & Crain, Ltd.

(57) ABSTRACT

A blade attachment-detachment assisting apparatus includes a nut rotating part having an engagement pin that engages with an engagement hole of a nut, a nut grip part that grips an annular groove of the nut, a housing that supports the nut rotating part rotatably by a predetermined angle, and a lock mechanism. The nut rotating part is capable of advancing and retreating, relative to the housing, to a protrusion position and a fixing position at which engagement between the nut grip part and the nut is kept, and is fixed to the housing with the intermediary of a spring. The lock mechanism includes an inside surface by which advancing and retreating of the nut rotating part are restricted through engagement of the nut rotating part with the housing when the housing is rotated in one direction at the fixing position to which the nut rotating part has been pushed.

5 Claims, 21 Drawing Sheets

(56) References Cited

U.S. PATENT DOCUMENTS

| | | | | |
|---|---|---|---|---|
| 4,924,738 A * | 5/1990 | Che | ............... | B23B 13/02 |
| | | | | 269/156 |
| 5,067,376 A * | 11/1991 | Fosella | ............... | B25B 13/44 |
| | | | | 81/115 |
| 5,464,233 A * | 11/1995 | Hanai | ............... | B23B 31/16229 |
| | | | | 279/137 |
| 8,231,434 B2 * | 7/2012 | Altmann | ............... | B23Q 3/15766 |
| | | | | 451/66 |
| 8,591,389 B2 * | 11/2013 | Tomioka | ............... | B23B 31/1071 |
| | | | | 483/55 |
| 10,933,500 B2 * | 3/2021 | Kiuchi | ............... | B23Q 3/15503 |
| 10,974,356 B2 * | 4/2021 | Terada | ............... | B28D 5/0076 |

FOREIGN PATENT DOCUMENTS

| | | | |
|---|---|---|---|
| JP | 2007098536 A | | 4/2007 |
| JP | 2007208114 A * | | 8/2007 |
| KR | 20070079912 A * | | 8/2007 |
| WO | WO-8701642 A1 * | 3/1987 | ............... B24B 45/003 |

* cited by examiner

BLADE ATTACHMENT-DETACHMENT ASSISTING APPARATUS

BACKGROUND OF THE INVENTION

Field of the Invention

The present invention relates to a blade attachment-detachment assisting apparatus that assists in attachment and detachment of a nut that fixes a cutting blade to a spindle.

Description of the Related Art

A cutting apparatus (dicing saw) that cuts workpieces with various plate shapes, such as a semiconductor wafer and SiC, by a cutting blade fixed to a spindle with the intermediary of a mount flange is known. The cutting blade is fixed to the mount flange by a nut in the state in which rotation of the spindle is restricted. Therefore, the cutting blade is attached to and detached from the spindle through attaching and detaching the nut. A jig when a nut is attached and detached (for example, refer to Japanese Patent Laid-open No. 2004-281700) and an automatic replacement mechanism of a cutting blade (for example, refer to Japanese Patent Laid-open No. 2007-098536) have been used.

The following operation is executed with the jig depicted in Japanese Patent Laid-open No. 2004-281700 and so forth. First, a housing is evacuated in order to open a nut grip part (grip claw) in the radial direction of an opposed nut. Thereafter, the nut is housed inside the nut grip claw and then the housing is caused to advance toward a spindle to house the nut grip claw inside and fix the grip state. Thereafter, the jig is rotated around the axis center to loosen or fasten the nut. However, with this jig, the advancing-retreating operation is necessary.

Furthermore, the automatic replacement mechanism that is depicted in Japanese Patent Laid-open No. 2007-098536 and causes a cutting blade of a cutting apparatus to be automatically replaced is also equipped with a mechanism similar to the jig depicted in Japanese Patent Laid-open No. 2004-281700.

SUMMARY OF THE INVENTION

The jig depicted in Japanese Patent Laid-open No. 2004-281700 and the automatic replacement mechanism depicted in Japanese Patent Laid-open No. 2007-098536 require a cylinder in order to cause the housing for opening and closing the nut grip claw to advance and retreat. For this reason, these jig and automatic replacement mechanism are a cause that brings increase in the complexity of the mechanism and increase in the cost.

Thus, an object of the present invention is to provide a blade attachment-detachment assisting apparatus that enables automatic attachment and detachment of a nut while intending reduction in the cost.

In accordance with an aspect of the present invention, there is provided a blade attachment-detachment assisting apparatus used for a cutting apparatus including a cutting blade mounted to a spindle, a nut for fixing the cutting blade to the spindle, and a rotation stop part that restricts rotation of the spindle. The blade attachment-detachment assisting apparatus includes a nut rotating part having an engaging part that engages with an engaged part of a surface of the nut, a nut grip part that is disposed on the nut rotating part and grips an outer circumferential part of the nut, a housing that surrounds the nut rotating part while supporting the nut rotating part rotatably by a predetermined angle, and a lock mechanism that keeps a state in which the nut grip part engages with the outer circumferential part of the nut. The nut rotating part is disposed to be capable of advancing and retreating, relative to the housing, to a protrusion position at which the nut grip part is allowed to be attached to and detached from the outer circumferential part of the nut and a fixing position at which the nut grip part is housed in the housing and engagement between the nut grip part and the nut is kept. The nut rotating part is fixed to the housing with the intermediary of a biasing part that pushes out the nut rotating part to the protrusion position. The lock mechanism includes a protrusion restricting part by which advancing and retreating of the nut rotating part are restricted through engagement of the nut rotating part with the housing when the housing is rotated in a direction that makes the nut loosened and the housing rotates relative to the nut rotating part to be positioned in a predetermined orientation at the fixing position to which the nut rotating part has been pushed.

Preferably, the nut rotating part is loosely fitted to the housing and is supported by a rotating shaft part or the housing tiltably based on an elastic member. Preferably, the engaged part of the surface of the nut is an engagement hole and the engaging part of the nut rotating part is an engagement pin and is disposed to be capable of advancing and retreating in a direction that makes engagement.

Preferably, the blade attachment-detachment assisting apparatus is fixed to an advancing-retreating unit that advances and retreats relative to the spindle of the cutting apparatus, together with a blade holding part that holds the cutting blade fixed to the spindle.

The present invention provides an effect of enabling automatic attachment and detachment of a nut while intending reduction in the cost.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will be described in detail with reference to the drawings. The present invention is not limited by contents described in the following embodiment. Furthermore, in constituent elements described below, what can be easily envisaged by those skilled in the art and what are substantially the same are included. Moreover, configurations described below can be combined as appropriate. In addition, various omissions, replacements, or changes of configurations can be executed in such a range as not to depart from the gist of the present invention.

Figure 1:
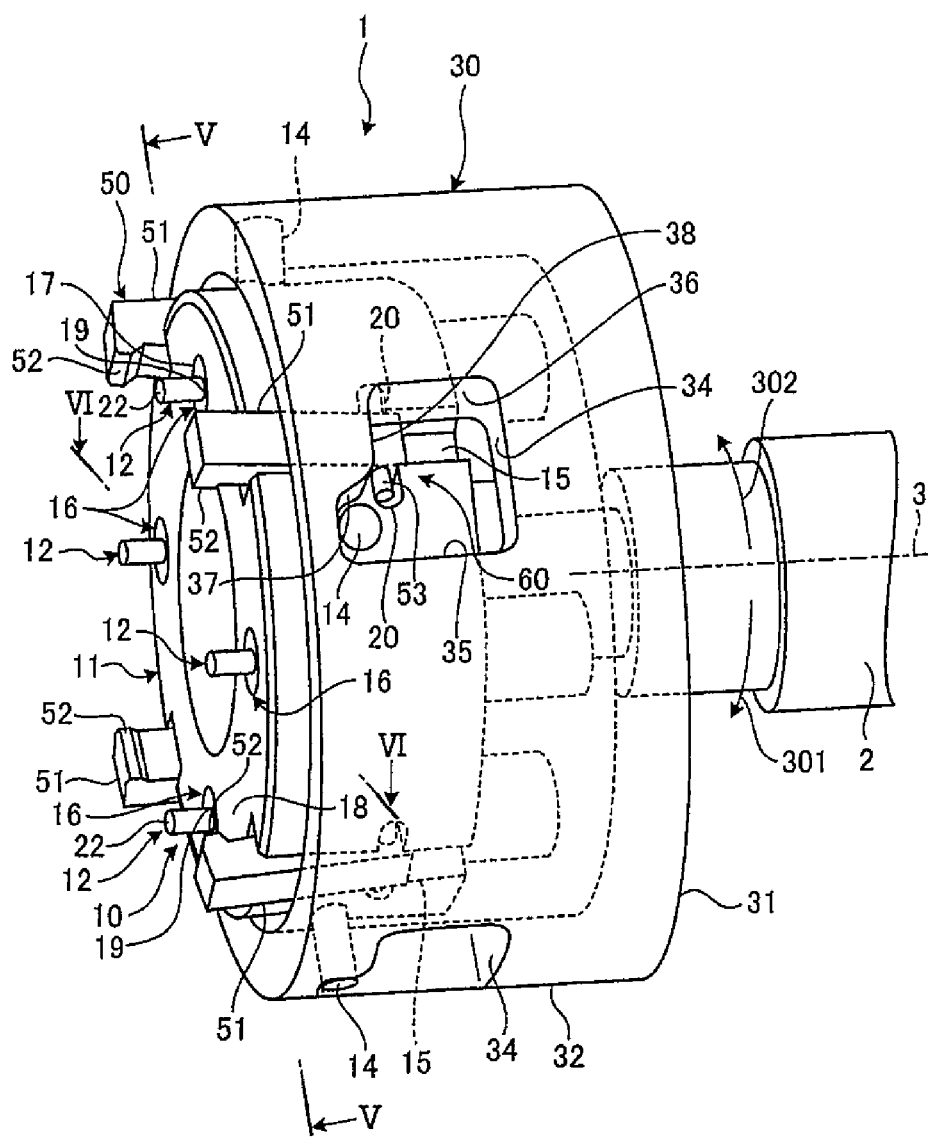
FIG. 1 is a perspective view depicting the configuration of a blade attachment-detachment assisting apparatus according to an embodiment.
Figure 2:
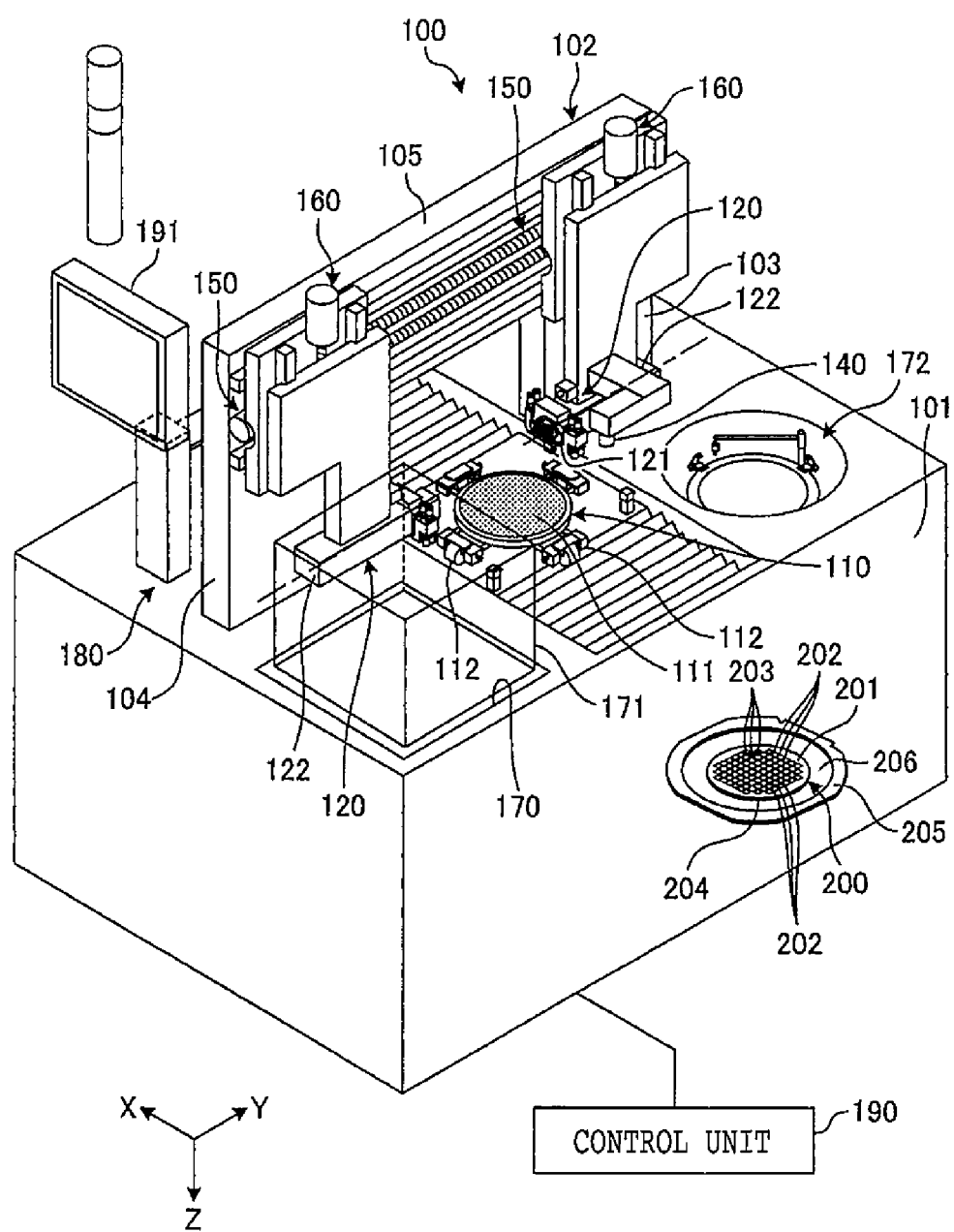
FIG. 2 is a perspective view depicting a configuration example of a cutting apparatus including the blade attachment-detachment assisting apparatus depicted in FIG. 1.
Figure 3:
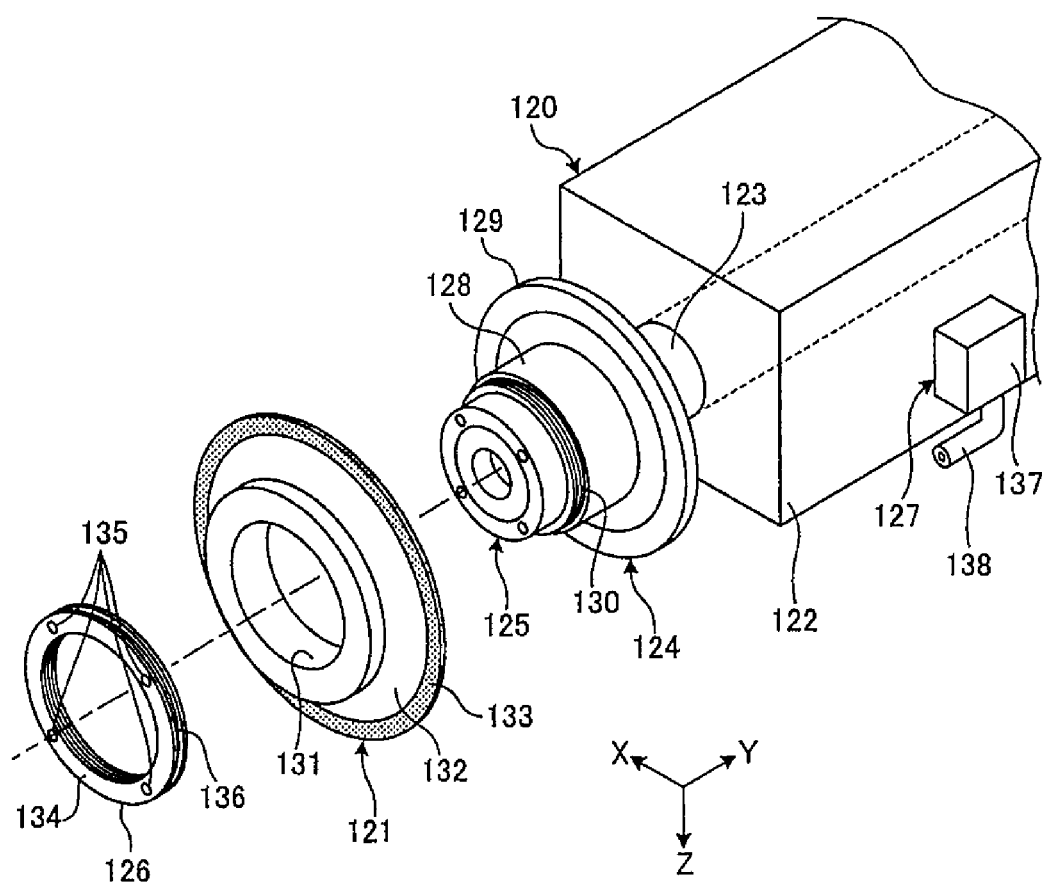
FIG. 3 is an exploded perspective view depicting part of a cutting unit of the cutting apparatus depicted in FIG. 2.
Figure 4:
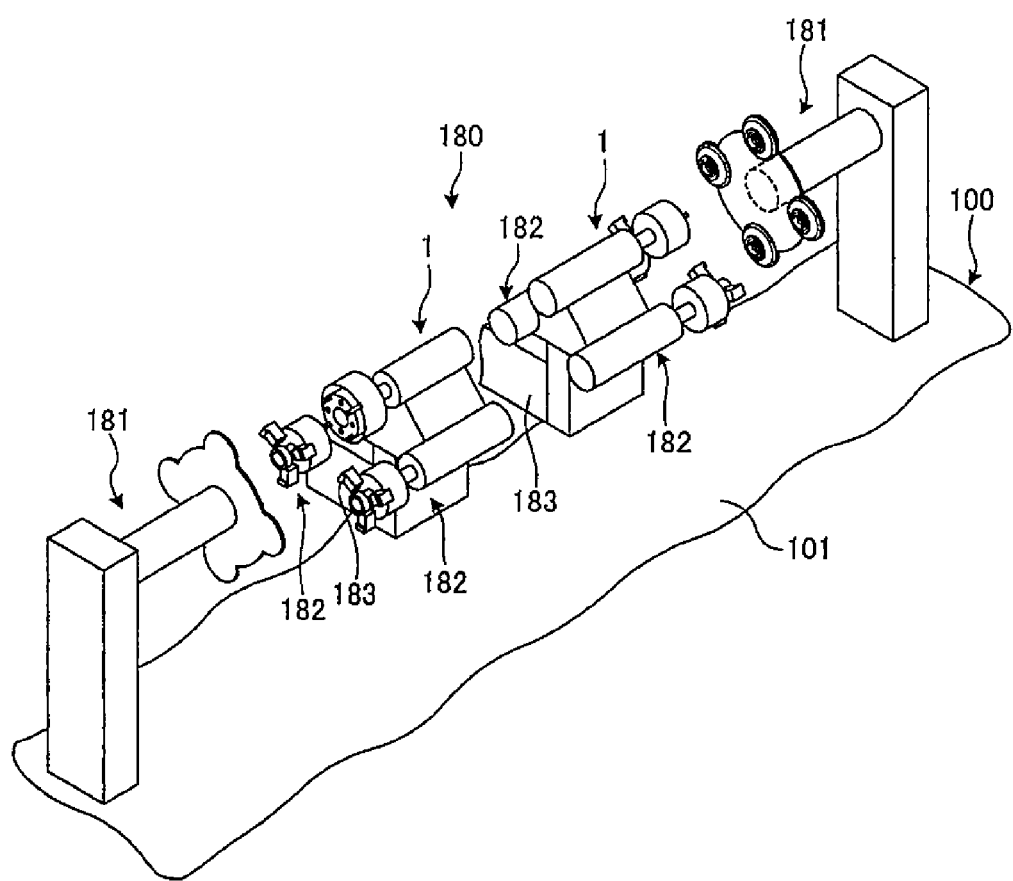
FIG. 4 is a perspective view depicting a configuration example of a blade attachment-detachment mechanism of the cutting apparatus depicted in FIG. 2.
Figure 5:
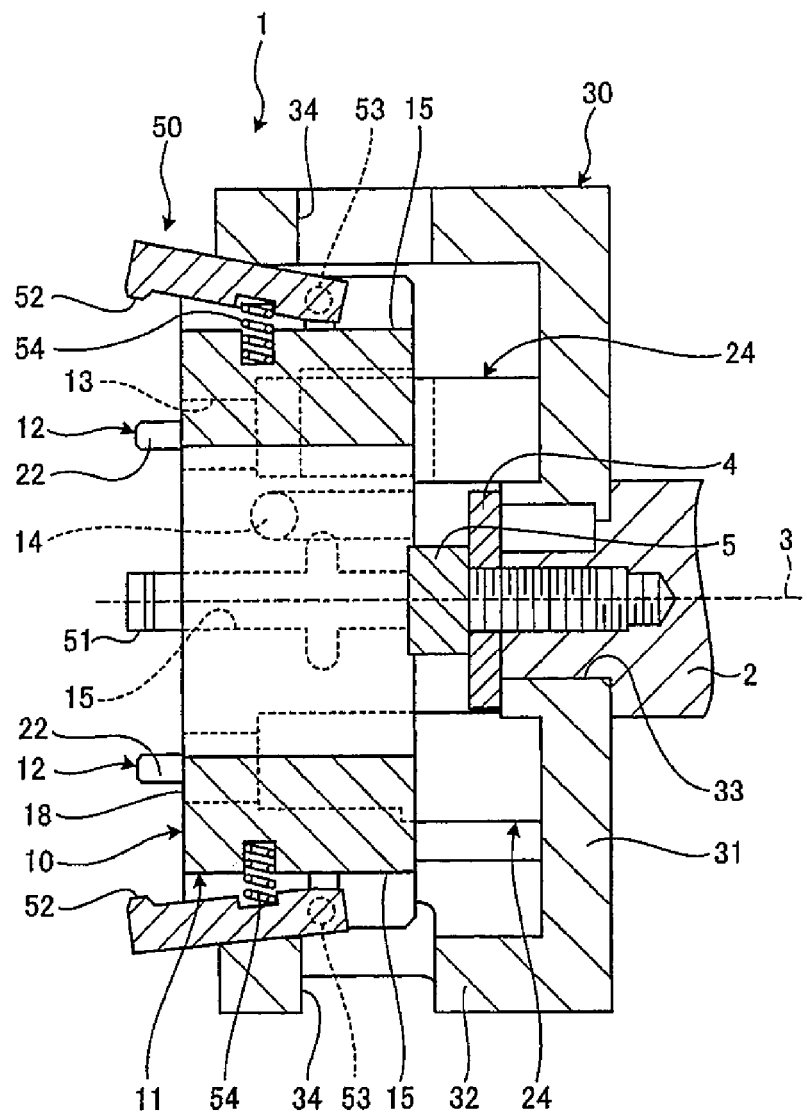
FIG. 5 is a sectional view along line V-V in FIG. 1.
Figure 5:
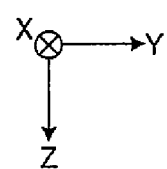
Figure 6:
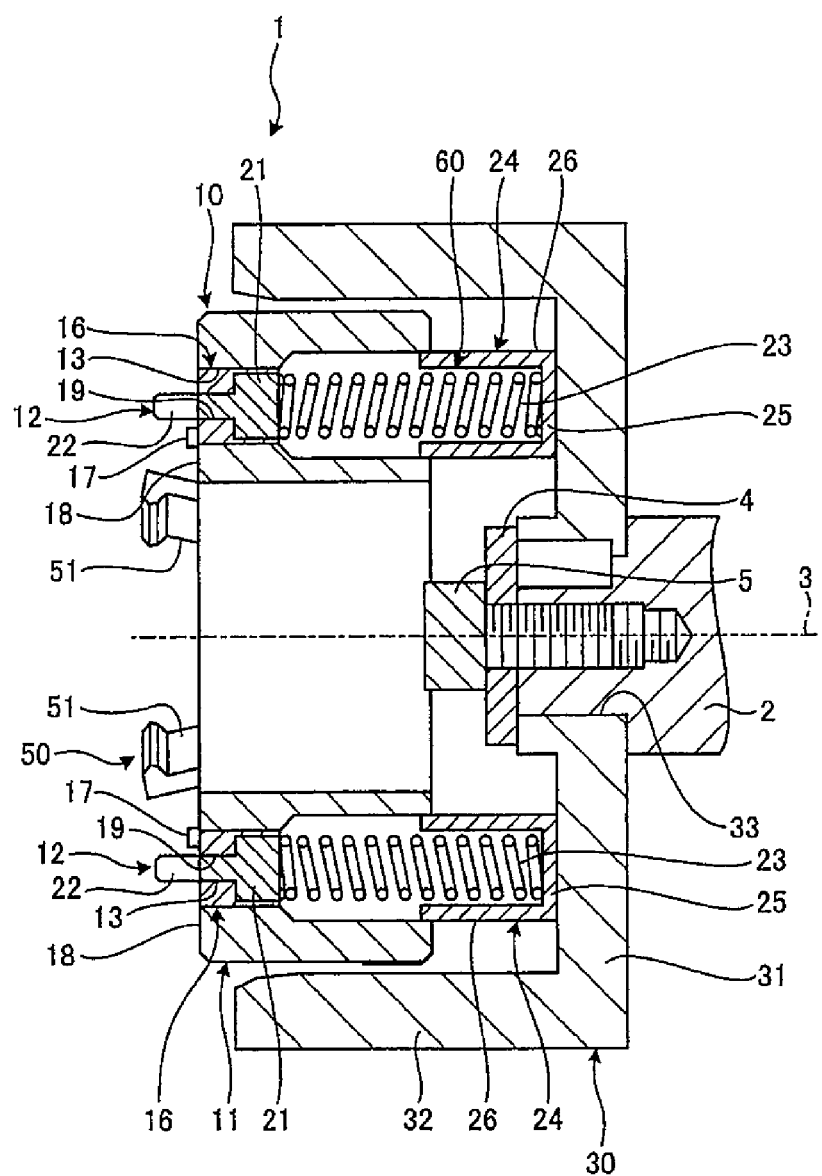
FIG. 6 is a sectional view along line VI-VI in FIG. 1.

A blade attachment-detachment assisting apparatus according to the embodiment of the present invention will be described based on the drawings. FIG. 1 is a perspective view depicting the configuration of the blade attachment-detachment assisting apparatus according to the embodiment. FIG. 2 is a perspective view depicting a configuration example of a cutting apparatus including the blade attachment-detachment assisting apparatus depicted in FIG. 1. FIG. 3 is an exploded perspective view depicting part of a cutting unit of the current apparatus depicted in FIG. 2. FIG. 4 is a perspective view depicting a configuration example of a blade attachment-detachment mechanism of the cutting apparatus depicted in FIG. 2. FIG. 5 is a sectional view along line V-V in FIG. 1. FIG. 6 is a sectional view along line VI-VI in FIG. 1.

(Cutting Apparatus)

A blade attachment-detachment assisting apparatus 1 according to the embodiment depicted in FIG. 1 configures a cutting apparatus 100 depicted in FIG. 2. The cutting apparatus 100 is an apparatus that cuts (processes) a workpiece 200 depicted in FIG. 2. In the embodiment, the workpiece 200 is a wafer, such as a semiconductor wafer or an optical device wafer, which is composed of silicon, sapphire, gallium, or the like and has a circular plate shape. In the workpiece 200, devices 203 are formed in regions marked out in a lattice manner by plural planned dividing lines 202 formed in a lattice manner in a front surface 201.

Furthermore, the workpiece 200 in the present invention may be what is called a TAIKO (registered trademark) wafer in which the central part is thinned and a large thickness part is formed at the peripheral part. Besides the wafer, the workpiece 200 may be a rectangular package substrate having plural devices sealed by a resin, a ceramic substrate, a ferrite substrate, a substrate containing at least one of nickel and iron, or the like. In the embodiment, a back surface 204 of the workpiece 200 is stuck to an adhesion tape 206 with a peripheral edge to which a ring-shaped frame 205 is mounted and the workpiece 200 is supported by the ring-shaped frame 205.

The cutting apparatus 100 depicted in FIG. 2 is an apparatus that holds the workpiece 200 by a chuck table 110 and cuts the workpiece 200 by a cutting blade 121 along the planned dividing lines 202. As depicted in FIG. 2, the cutting apparatus 100 includes the chuck table 110 that sucks and holds the workpiece 200 by a holding surface 111, cutting units 120 that cut the workpiece 200 held by the chuck table 110 by the cutting blade 121, an imaging unit 140 that photographs the workpiece 200 held by the chuck table 110, a control unit 190, and a blade attachment-detachment mechanism 180.

Furthermore, as depicted in FIG. 2, the cutting apparatus 100 includes at least an X-axis movement unit that executes processing feed of the chuck table 110 in an X-axis direction parallel to the horizontal direction and is not depicted in the diagram, Y-axis movement units 150 that execute indexing feed of the cutting unit 120 in a Y-axis direction that is parallel to the horizontal direction and is orthogonal to the X-axis direction, and Z-axis movement units 160 that execute cutting-in feed of the cutting unit 120 in a Z-axis direction parallel to the vertical direction orthogonal to both the X-axis direction and the Y-axis direction. As depicted in FIG. 2, the cutting apparatus 100 is a cutting apparatus having two cutting units 120, i.e. 2-spindle dicer, that is, a cutting apparatus of what is called a facing dual type.

The chuck table 110 has a circular disc shape, and the holding surface 111 that holds the workpiece 200 is formed of porous ceramic or the like. Furthermore, the chuck table 110 is disposed to be movable in the X-axis direction by the X-axis movement unit between a processing region below the cutting unit 120 and a carry-in/out region that is separate from the lower side of the cutting unit 120 and in which the workpiece 200 is carried in and out. In addition, the chuck table 110 is disposed to be rotatable around the axis center parallel to the Z-axis direction by a rotational drive source.

The chuck table 110 is connected to a vacuum suction source that is not depicted in the diagram and is sucked by the vacuum suction source to suck and hold the workpiece 200 placed on the holding surface 111. In the embodiment, the chuck table 110 sucks and holds the side of the back surface 204 of the workpiece 200 with the intermediary of the adhesion tape 206. Furthermore, plural clamp parts 112 that clamp the ring-shaped frame 205 are disposed around the chuck table 110 as depicted in FIG. 2.

The cutting units 120 are cutting means to which the cutting blade 121 that cuts the workpiece 200 held by the chuck table 110 is mounted attachably/detachably. The cutting units 120 are each disposed to be movable in the Y-axis direction by the Y-axis movement unit 150 relative to the workpiece 200 held by the chuck table 110 and disposed to be movable in the Z-axis direction by the Z-axis movement unit 160.

As depicted in FIG. 2, one cutting unit 120 is disposed on one column part 103 of a gate-shaped support frame 102 disposed upright from an apparatus main body 101 with the intermediary of the Y-axis movement unit 150, the Z-axis movement unit 160, and so forth. As depicted in FIG. 2, the other cutting unit 120 is disposed on the other column part 104 of the support frame 102 with the intermediary of the Y-axis movement unit 150, the Z-axis movement unit 160, and so forth. The support frame 102 couples the upper ends of the column parts 103 and 104 to each other by a horizontal beam 105.

The cutting unit 120 allows the cutting blade 121 to be positioned at any position on the holding surface 111 of the chuck table 110 by the Y-axis movement unit 150 and the Z-axis movement unit 160.

As depicted in FIG. 3, the cutting unit 120 includes a spindle housing 122 disposed to be movable in the Y-axis direction and the Z-axis direction by the Y-axis movement unit 150 and the Z-axis movement unit 160, a spindle 123 that is disposed in the spindle housing 122 rotatably around the axis center and is rotated by a motor that is not depicted in the diagram, and a mount 124 mounted to the tip part of the spindle 123. Furthermore, the cutting unit 120 includes the cutting blade 121 mounted to the mount 124, a nut 126 for sandwiching the cutting blade 121 with the mount 124 to fix the cutting blade 121 to the spindle 123, and a rotation stop part 127 that restricts rotation of the spindle 123.

The mount 124 is fixed to the tip part of the spindle 123. The mount 124 includes a boss part 128 with a circular cylindrical shape and a receiving flange part 129 disposed at one end part of the boss part 128 closer to the spindle housing 122. The boss part 128 extends along the axis center direction of the mount 124 and is formed in such a manner that the outer diameter is substantially equal to the inner diameter of an insertion port 131 of the cutting blade 121 across the whole length. That the outer diameter of the boss part 128 is substantially equal to the inner diameter of an insertion port 131 of the cutting blade 121 indicates that the outer circumferential surface of the boss part 128 and the inner circumferential surface of the insertion port 131 get contact with each other at least at the position in the axis center direction at which the cutting blade 121 is fixed to the mount 124.

The receiving flange part 129 is formed into a circular ring shape that protrudes from the one end part of the boss part 128 closer to the spindle housing 122 toward the outer circumference along the radial direction and has a larger diameter than the outer diameter of the boss part 128. The receiving flange part 129 supports the cutting blade 121 at an outer edge part. The boss part 128 and the receiving flange part 129 are coaxially disposed. Furthermore, in the mount 124, a male screw 130 is formed at the outer circumference of the other end part of the boss part 128.

The cutting blade 121 is an extremely-thin cutting abrasive having a substantially ring shape. In the embodiment, the cutting blade 121 is what is called a hub cutting blade and includes a circular-ring-shaped circular base 132 that is composed of an electrically-conductive metal and has the insertion port 131 at the center and a circular-ring-shaped cutting edge part 133 that is disposed on the outer circumferential edge of the circular base 132 and cuts the workpiece 200. The insertion port 131 of the circular base 132 is a hole for allowing the one end part of the boss part 128 to pass through the inside thereof to mount the cutting blade 121 to the mount 124. The cutting edge part 133 is composed of abrasive grains of diamond, cubic boron nitride (CBN), or the like and a bond material (binder material) of a metal, resin, or the like and is formed into a predetermined thickness. In the present invention, the cutting blade 121 may be a washer cutting blade formed only of the cutting edge part 133.

In the cutting blade 121 configured in this manner, the insertion port 131 of the circular base 132 is fitted to the outer circumference of the cylindrical boss part 128 of the mount 124. The cutting blade 121 is clamped and fixed by the receiving flange part 129 of the mount 124 and the nut 126 by screwing the nut 126 to the male screw 130 formed in the cylindrical boss part 128. The axis center that is the center of the spindle 123, the mount 124, and the cutting blade 121 of the cutting unit 120 is set parallel to the Y-axis direction.

The nut 126 is formed into a circular ring shape, and a female screw that screws to the male screw 130 formed in the mount 124 is formed in the inner circumferential surface of the nut 126. In the nut 126, engagement holes 135 that are four engaged parts are made in a surface 134 at equal intervals in the circumferential direction, and an annular groove 136 that is an outer circumferential part is made in the outer circumferential surface across the whole circumference. The engagement holes 135 are recessed from an end surface (surface) of the nut 126, and the annular groove 136 is recessed from the outer circumferential surface of the nut 126. In the embodiment, the engaged parts are the engagement holes 135 that are recessed from the surface 134 of the nut 126. However, in the present invention, the engaged parts are not limited to the engagement holes 135.

The rotation stop part 127 includes a cylinder unit 137 attached to an outer surface of the spindle housing 122, a lock member that is not depicted in the diagram and is disposed in the cylinder unit 137 movably in a direction orthogonal to the axis center of the spindle 123, a spring as biasing means that causes the lock member to be biased in such a direction as to get further away from the spindle 123 and is not depicted in the diagram, and an air supply nozzle 138 for supplying a pressurized gas into the cylinder unit 137. The lock member protrudes from the inner circumferential surface of the spindle housing 122 and can engage with a lock hole that is made in the outer circumferential surface of the spindle 123 and is not depicted in the diagram.

In the rotation stop part 127, when the pressurized gas is supplied into the cylinder unit 137 through the air supply nozzle 138, the pressurized gas presses the lock member toward the spindle 123 against the biasing force of the spring and causes the lock member to engage with the lock hole to restrict rotation of the spindle 123 around the axis center. In the rotation stop part 127, when the supply of the pressurized gas into the cylinder unit 137 through the air supply nozzle 138 is stopped, the spring causes the lock member to move in such a direction as to get further away from the spindle 123 and releases the engagement of the lock member with the lock hole to permit the rotation of the spindle 123 around the axis center.

The imaging unit 140 is fixed to the cutting unit 120 so as to move integrally with the cutting unit 120. The imaging unit 140 includes an imaging element that photographs the region to be divided in the workpiece 200 which is held by the chuck table 110 before being cut. The imaging element is a charge-coupled device (CCD) imaging element or a complementary metal-oxide-semiconductor (CMOS) imaging element, for example. The imaging unit 140 photographs the workpiece 200 held by the chuck table 110 and obtains an image for performing alignment to execute position adjustment between the workpiece 200 and the cutting blade 121, and so forth, to output the obtained image to the control unit 190.

The X-axis movement unit executes processing feed of the chuck table 110 and the cutting unit 120 relatively along the X-axis direction by moving the chuck table 110 in the X-axis direction, which is the processing feed direction. The Y-axis movement units 150 execute indexing feed of the chuck table 110 and the cutting unit 120 relatively along the Y-axis direction by moving the cutting unit 120 in the Y-axis direction, which is the indexing feed direction. The Z-axis movement units 160 execute cutting-in feed of the chuck table 110 and the cutting unit 120 relatively along the Z-axis direction by moving the cutting unit 120 in the Z-axis direction, which is the cutting-in feed direction.

The X-axis movement unit, the Y-axis movement units 150, and the Z-axis movement units 160 each include a known ball screw disposed rotatably around the axis center, a known motor that rotates the ball screw around the axis center, and known guide rails that support the chuck table 110 or the cutting unit 120 movably in the X-axis direction, the Y-axis direction, or the Z-axis direction.

Furthermore, the cutting apparatus 100 includes an X-axis direction position detecting unit that is for detecting the position of the chuck table 110 in the X-axis direction and is not depicted in the diagram, a Y-axis direction position detecting unit that is for detecting the position of the cutting unit 120 in the Y-axis direction and is not depicted in the diagram, and a Z-axis direction position detecting unit for detecting the position of the cutting unit 120 in the Z-axis direction. The X-axis direction position detecting unit and the Y-axis direction position detecting unit can be configured by a linear scale parallel to the X-axis direction or the Y-axis direction and a reading head. The Z-axis direction position detecting unit detects the position of the cutting unit 120 in the Z-axis direction by a pulse of the motor. The X-axis direction position detecting unit, the Y-axis direction position detecting unit, and the Z-axis direction position detecting unit output the position of the chuck table 110 in the X-axis direction and the position of the cutting unit 120 in the Y-axis direction or the Z-axis direction to the control unit 190.

Furthermore, the cutting apparatus 100 includes a cassette elevator 170 on which a cassette 171 that houses the workpieces 200 before and after being cut is placed and that moves the cassette 171 in the Z-axis direction, a cleaning unit 172 that cleans the workpiece 200 after being cut, and a conveyance unit that is not depicted in the diagram, carries the workpiece 200 to and from the cassette 171, and conveys the workpiece 200.

The control unit 190 is also a unit that controls each of the above-described respective units of the cutting apparatus 100 and causes the cutting apparatus 100 to execute processing operation to the workpiece 200. The control unit 190 is a computer having an arithmetic processing apparatus having a microprocessor such as a central processing unit (CPU), a storing apparatus having a memory such as a read only memory (ROM) or a random access memory (RAM), and an input-output interface apparatus. The arithmetic processing apparatus of the control unit 190 executes arithmetic processing in accordance with a computer program stored in the storing apparatus and outputs a control signal for controlling the cutting apparatus 100 to the respective units of the cutting apparatus 100 through the input-output interface apparatus.

The control unit 190 is connected to a display unit 191 (depicted in FIG. 2) including a liquid crystal display apparatus or the like that displays the state of processing operation, an image, and so forth and an input unit used when an operator registers processing contents information and so forth. The input unit includes at least one of a touch panel disposed in the display unit 191 and an external input apparatus such as a keyboard.

The blade attachment-detachment mechanism 180 is a mechanism to replace the cutting blade 121 of each cutting unit 120. The blade attachment-detachment mechanism 180 is set at a position that is on the back surface side of the support frame 102 in FIG. 2 and is further away from the carry-in/out region than the processing region. As depicted in FIG. 4, the blade attachment-detachment mechanism 180 includes a blade stocker 181 that holds the cutting blades 121 before and after replacement, the blade attachment-detachment assisting apparatus 1, blade chucks 182 that are two blade holding parts, and an advancing-retreating unit 183.

In the embodiment, the blade stocker 181, the blade attachment-detachment assisting apparatus 1, the two blade chucks 182, and the advancing-retreating unit 183 correspond to each other to configure one set, and the one set is disposed so as to correspond to the cutting unit 120 in a one-to-one relationship. That is, in the embodiment, the blade attachment-detachment mechanism 180 includes two sets of the blade stocker 181, the blade attachment-detachment assisting apparatus 1, the two blade chucks 182, and the advancing-retreating unit 183.

Furthermore, in the embodiment, one blade stocker 181 holds plural cutting blades 121 before and after replacement for the spindle 123 of one cutting unit 120, and the other blade stocker 181 holds plural cutting blades 121 before and after replacement for the spindle 123 of the other cutting unit 120.

The blade chucks 182 hold the cutting blade 121. One blade chuck 182 removes the cutting blade 121 attached to the corresponding cutting unit 120 from the spindle 123 and holds the cutting blade 121. The other blade chuck holds the cutting blade 121 supplied from the corresponding blade stocker 181 and attaches the held cutting blade 121 to the spindle 123 of the corresponding cutting unit 120. The blade attachment-detachment assisting apparatus 1 attaches and detaches the nut 126 of the corresponding cutting unit 120 to and from the spindle 123.

The advancing-retreating unit 183 moves the blade attachment-detachment assisting apparatus 1 and the two blade chucks 182 in the X-axis direction, the Y-axis direction, and the Z-axis direction between a position further away from the carry-in/out region than the support frame 102 and a position opposed to the spindle 123 of each cutting unit 120 in the Y-axis direction. For this purpose, the blade attachment-detachment assisting apparatus 1 is attached to the advancing-retreating unit 183 that advances and retreats relative to the spindle 123 of the corresponding cutting unit 120 of the cutting apparatus 100 together with the two blade chucks 182. Furthermore, in the present invention, in position adjustment between the axis center of the spindle 123 and the blade attachment-detachment assisting apparatus 1 or the blade chuck 182, the advancing-retreating unit 183 may only execute position adjustment in the X-axis direction, and the cutting unit 120 may execute position adjustment in the Y-axis and Z-axis directions.

(Blade Attachment-Detachment Assisting Apparatus)

The blade attachment-detachment assisting apparatus 1 is an apparatus used for the cutting apparatus 100. As depicted in FIG. 1, FIG. 4, and FIG. 5, the blade attachment-detachment assisting apparatus 1 includes a rotating shaft part 2, a nut rotating part 10, a nut grip part 50, a housing 30, and a lock mechanism 60.

The rotating shaft part 2 is formed into a circular column shape in appearance, and an axis center 3 is disposed in parallel to the Y-axis direction. The rotating shaft part 2 is rotated in both of one direction 301 (depicted in FIG. 1) and the other direction 302 (depicted in FIG. 1) that is the opposite direction of the one direction 301 around the axis center by a motor that is not depicted in the diagram. Furthermore, the tip part of the rotating shaft part 2 is positioned to a position opposed to the spindle 123 of each cutting unit 120 in the Y-axis direction by the advancing-retreating unit 183.

The nut rotating part 10 is attached to the tip part of the rotating shaft part 2 with the intermediary of the housing 30 and is disposed coaxially with the rotating shaft part 2. The nut rotating part 10 includes a rotating part main body 11 with a circular ring shape and engagement pins 12 that are engaging parts that engage with the engagement holes 135 of the surface 134 of the nut 126.

In the rotating part main body 11, plural (in the embodiment, four) engagement pin loose insertion holes 13, plural drop prevention pins 14, plural (in the embodiment, four) grip member support grooves 15 are made. The engagement pin loose insertion holes 13 penetrate the rotating part main body 11 along the axis center 3 and are disposed at equal intervals in the circumferential direction of the rotating part main body 11. Sleeves 16 are fixed to the inside of the engagement pin loose insertion holes 13. Surfaces 17 of the sleeves 16 are located on the same plane as a surface 18 opposed to the spindle 123 of each cutting unit 120 in the rotating part main body 11. Furthermore, in the sleeves 16, through-holes 19 penetrate at the center.

The drop prevention pins 14 are disposed on the outer circumferential surface of the rotating part main body 11 and, in the embodiment, are formed into a circular column shape that protrudes outward from the outer circumferential surface of the rotating part main body 11. The drop prevention pins 14 are disposed at equal intervals in the circumferential direction of the rotating part main body 11. The drop prevention pins 14 are made to pass in cam holes 34 of the housing 30 to attach the nut rotating part 10 to the housing 30 and prevent the nut rotating part 10 from dropping off from the housing 30.

The grip member support grooves 15 are recessed from the outer circumferential surface of the rotating part main body 11 and are formed into a straight line shape along the axis center 3. The grip member support grooves 15 are disposed at equal intervals in the circumferential direction of the rotating part main body 11. Furthermore, shaft receiving grooves 20 are each continuous with the center of the grip member support groove 15 in the direction of the axis center 3. The shaft receiving groove 20 is recessed from the outer circumferential surface of the rotating part main body 11 and is continuous with both ends of the grip member support groove 15 in the width direction.

The engagement pin 12 monolithically includes a circular plate part 21 with a circular disc shape and a pin 22 disposed upright from the center of the circular plate part 21. The circular plate part 21 is formed in such a manner that the outer diameter thereof is larger than the inner diameter of the through-hole 19 and is substantially equal to the inner diameter of the engagement pin loose insertion hole 13, and is housed in the engagement pin loose insertion hole 13. The pin 22 is formed in such a manner that the outer diameter thereof is substantially equal to the inner diameter of the through-hole 19, and is made to pass in the through-hole 19. The pin 22 can enter the inside of the engagement hole 135 of the nut 126 and engage with the engagement hole 135. The engagement pin 12 is disposed in such a manner that the pin 22 is inserted in the through-hole 19, that the circular plate part 21 is housed in the engagement pin loose insertion hole 13, and that the engagement pin 12 can advance and retreat (that is, movably) along the axis center 3, which is the direction of engagement, in the engagement pin loose insertion hole 13. Furthermore, in the engagement pins 12, the pins 22 are biased in such a direction as to protrude from the surfaces 17 and 18 by springs 23 that are elastic members and biasing parts. Because the sleeves 16 are fixed to the inside of the engagement pin loose insertion holes 13, the springs 23 cause the nut rotating part 10 to be biased along the axis center 3 in such a direction as to protrude from the housing 30.

The springs 23 are housed in the engagement pin loose insertion holes 13. In the embodiment, the spring 23 is disposed between the circular plate part 21 of the engagement pin 12 and a bottom part 25 of a sleeve 24 that can be inserted into the base end part of the engagement pin loose insertion hole 13 on the side of the rotating shaft part 2 and is disposed movably along the axis center 3 relative to the rotating part main body 11. The sleeves 24 monolithically include the bottom part 25 with a circular disc shape and a cylindrical part 26 that is continuous with the outer edge of the bottom part 25 and has a circular cylindrical shape, and are formed into a bottomed cylindrical shape. The outer diameter of the bottom parts 25 and the cylindrical parts 26 of the sleeves 24 is substantially equal to the inner diameter of the engagement pin loose insertion holes 13.

The housing 30 surrounds the outer circumference of the nut rotating part 10. The housing 30 monolithically includes a bottom part 31 with a circular disc shape and a cylindrical part 32 that is continuous with the outer edge of the bottom part 31 and has a circular cylindrical shape, and is formed into a bottomed cylindrical shape. In the bottom part 31, a through-hole 33 is formed at the center. The housing 30 is attached to the tip part of the rotating shaft part 2 by a screw 5 that passes through the inside of a washer 4 overlapped with the bottom part 31 and the through-hole 33 and is screwed to a screw hole made in the tip surface of the rotating shaft part 2. When the housing 30 is attached to the rotating shaft part 2, the bottom part 31 and the cylindrical part 32 are coaxial with the rotating shaft part 2. The inner diameter of the cylindrical part 32 is slightly larger than the outer diameter of the rotating part main body 11 of the nut rotating part 10.

In the housing 30, plural (in the embodiment, four) cam holes 34 which the drop prevention pins 14 of the nut rotating part 10 enter to support the nut rotating part 10 rotatably around the axis center 3 by a predetermined angle are made in the cylindrical part 32. The cam holes 34 penetrate the cylindrical part 32. The cam holes 34 include a larger-width part 35 disposed on the side of the one direction 301 around the axis center 3 and a smaller-width part 36 disposed on the side of the other direction 302 around the axis center 3. The width of the larger-width part 35 in the direction of the axis center 3 is larger than the width of the smaller-width part 36 in the direction of the axis center 3. The widths of the larger-width part 35 and the smaller-width part 36 in the direction of the axis center 3 are larger than at least the radius, preferably the diameter, of the drop prevention pin 14. Furthermore, in the cam hole 34, a step surface 37 continuous with the larger-width part 35 and the smaller-width part 36 is formed on the tip side. Inside surfaces 38 of the smaller-width parts 36 of the cam holes 34 on the tip side are formed to be flat in a direction orthogonal to the axis center 3. The inside surfaces 38 serve as protrusion restricting parts by which advancing of the nut rotating part 10 toward a protrusion position is restricted through engagement of the drop prevention pins 14 of the nut rotating part 10 biased by the springs 23 with the inside surfaces 38. Due to the engagement of the drop prevention pins 14 of the nut rotating part 10 biased by the springs 23 with the inside surfaces 38, the nut rotating part 10 engages with the housing 30.

When the housing 30 is attached to the rotating shaft part 2 with the drop prevention pins 14 entering the inside of the cam holes 34, the sleeves 24 biased by the springs 23 abut against the bottom part 31. For this reason, when the drop prevention pins 14 are located in the larger-width parts 35 of the cam holes 34, the nut rotating part 10 is located at the protrusion position depicted in FIG. 5 and so forth at which the surface of the rotating part main body 11 protrudes toward the side of the spindle 123 of each cutting unit 120 relative to the housing 30 due to the biasing force of the springs 23. As above, the springs 23 push out the nut rotating part 10 toward the protrusion position.

Figure 9:
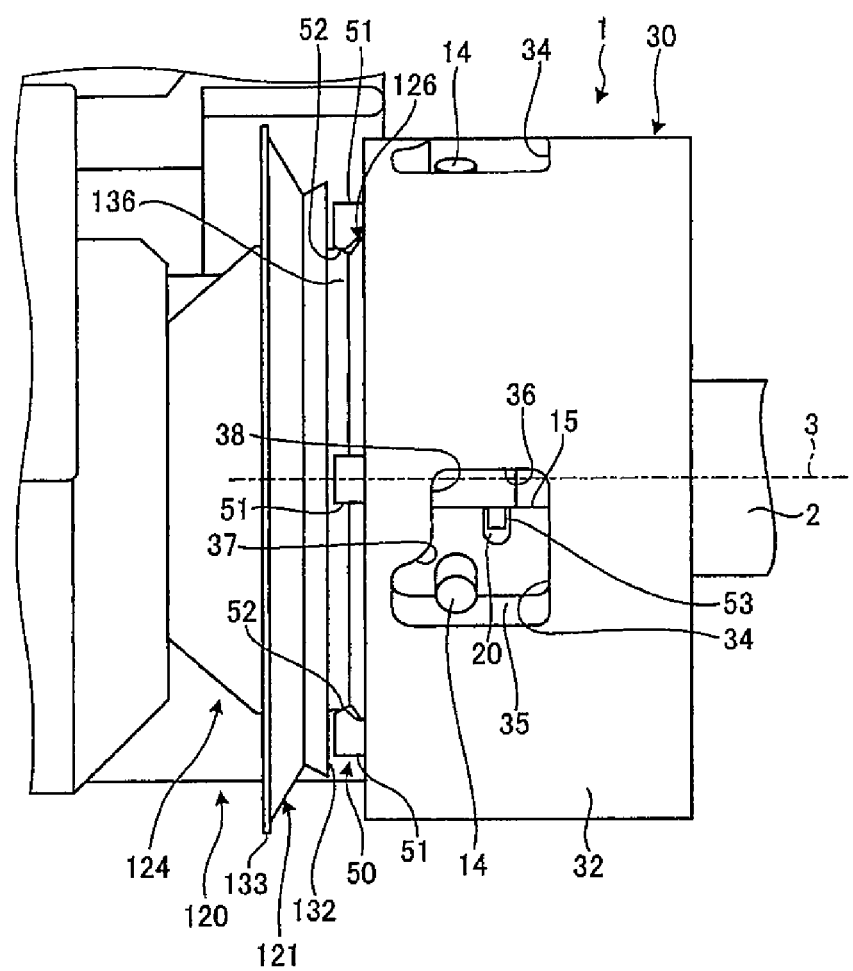
FIG. 9 is a side view depicting the state in which grip claws of grip members of a nut grip part of the blade attachment-detachment assisting apparatus depicted in FIG. 7 engage with an annular groove of a nut.

Furthermore, when the rotating part main body 11 of the nut rotating part 10 is pressed along the axis center 3 in such a direction as to sink in the housing 30 against the biasing force of the springs 23, the nut rotating part 10 is located at a fixing position depicted in FIG. 9 and so forth at which the surface of the rotating part main body 11 sinks in the housing 30. As above, the nut rotating part 10 is disposed to be capable of advancing and retreating relative to the housing 30 in the direction of the axis center 3 between the protrusion position and the fixing position. At the fixing position, the drop prevention pins 14 are located on the base end side relative to the step surfaces 37. Therefore, the nut rotating part 10 is supported rotatably around the axis center 3 relative to the housing 30 between a position with which the drop prevention pins 14 abut against the inner surface of the cam hole 34 on the side of the one direction 301 and a position with which the drop prevention pins 14 abut against the inner surface of the cam hole 34 on the side of the other direction 302. As above, the predetermined angle is the angle around the axis center 3 between the position with which the drop prevention pins 14 abut against the inner surface of the cam hole 34 on the side of the one direction 301 and the position with which the drop prevention pins 14 abut against the inner surface of the cam hole 34 on the side of the other direction 302.

Furthermore, the bottom parts 25 of the sleeves 24 biased by the springs 23 housed in the engagement pin loose insertion holes 13 abut against the bottom part 31 of the housing 30. Due to this, the nut rotating part 10 is attached to the housing 30 with the intermediary of the springs 23 and the sleeves 24. Moreover, the outer diameter of the rotating part main body 11 is smaller than the inner diameter of the cylindrical part of the housing 30, and the bottom parts 25 of the sleeves 24 biased by the springs 23 housed in the engagement pin loose insertion holes 13 abut against the bottom part 31 of the housing 30. Due to this, the nut rotating part 10 is supported by the springs 23 tiltably with respect to the axis center 3. In the embodiment, the springs 23 bias the engagement pins 12 and push out the nut rotating part 10 to the protrusion position. However, in the present invention, the elastic members that bias the engagement pins 12 and the biasing parts that push out the nut rotating part 10 to the protrusion position may be formed of elastic members of separate bodies from each other.

The nut grip part 50 is disposed in the nut rotating part 10 and grips the annular groove 136 of the nut 126. The nut grip part 50 includes plural (in the embodiment, four) grip members 51. The grip members 51 are formed into an arm shape and are supported in the grip member support grooves 15, and the longitudinal direction thereof is disposed in parallel to the axis center 3. The grip members 51 include a grip claw 52 that is disposed at the tip part protruding from the surface of the nut rotating part 10 and can engage with the annular groove 136 made at the outer circumference of the nut 126 and a pivot shaft 53 that is disposed at the base end part closer to the rotating shaft part 2 and is rotatably supported in the shaft receiving groove 20. In the grip members 51, the grip claws 52 get closer to or further away from each other through rotation of the pivot shafts 53 in the shaft receiving grooves 20. Furthermore, compression springs 54 are each disposed between the bottom surface of the grip member support groove 15 and the central part of the grip member 51 in the longitudinal direction. The compression springs 54 biases the grip members 51 in such a manner that the grip claws 52 are always headed outward in the radial direction.

In the nut grip part 50, due to the biasing of the grip members 51 by the compression springs 54, when the nut rotating part 10 is positioned to the protrusion position, the grip claws 52 of the grip members 51 get further away from each other and the grip claws 52 become capable of being attached to and detached from the annular groove 136 of the nut 126 without engaging with the annular groove 136. In the nut grip part 50, when the nut rotating part 10 is positioned to the fixing position, the grip members 51 are housed in the housing 30 together with the nut rotating part 10 and the tip parts of the grip members 51 are pressed against the biasing force of the compression springs 54, so that the grip claws 52 get closer to each other. In the nut grip part 50, when the nut rotating part 10 is positioned to the fixing position, the grip claws 52 of the grip members 51 engage with the annular groove 136 and the state in which the grip claws 52 engage with the annular groove 136 is kept. In this manner, when the nut rotating part 10 is positioned to the fixing position, the engagement between the grip claws 52 of the grip members 51 of the nut grip part 50 and the annular groove 136 of the nut 126 is kept.

In the embodiment, in the blade attachment-detachment assisting apparatus 1, the inside surfaces 38 of the smaller-width parts 36 of the cam holes 34, the drop prevention pins 14, and the springs 23 configure the lock mechanism 60 that keeps the state in which the grip claws 52 of the grip members 51 of the nut grip part 50 engage with the annular groove 136 of the nut 126. In the lock mechanism 60, the springs 23 bias the nut rotating part 10 toward the protrusion position, and the drop prevention pins 14 engage with the inside surfaces 38. Thereby, the lock mechanism 60 keeps the state in which the nut grip part 50 engages with the annular groove 136 of the nut 126.

Figure 7:
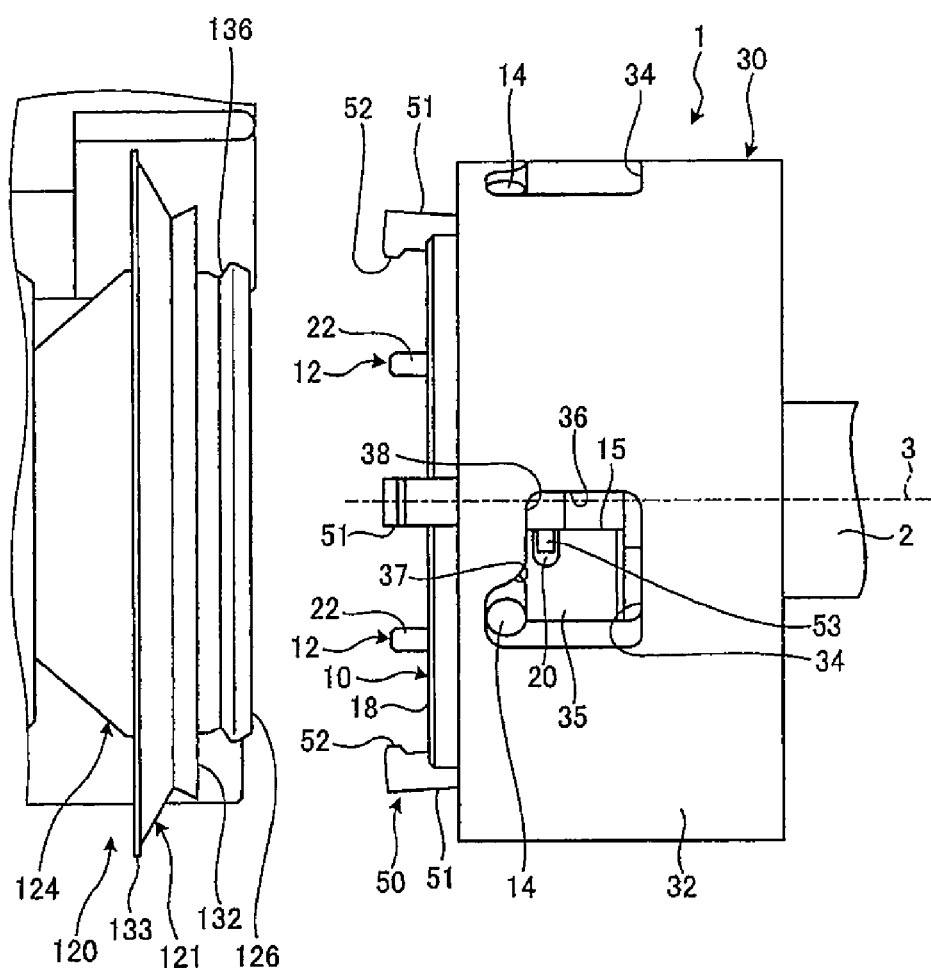
FIG. 7 is a side view depicting the state in which the blade attachment-detachment assisting apparatus according to the embodiment is made opposed to a spindle of the cutting unit in a Y-axis direction.
Figure 8:
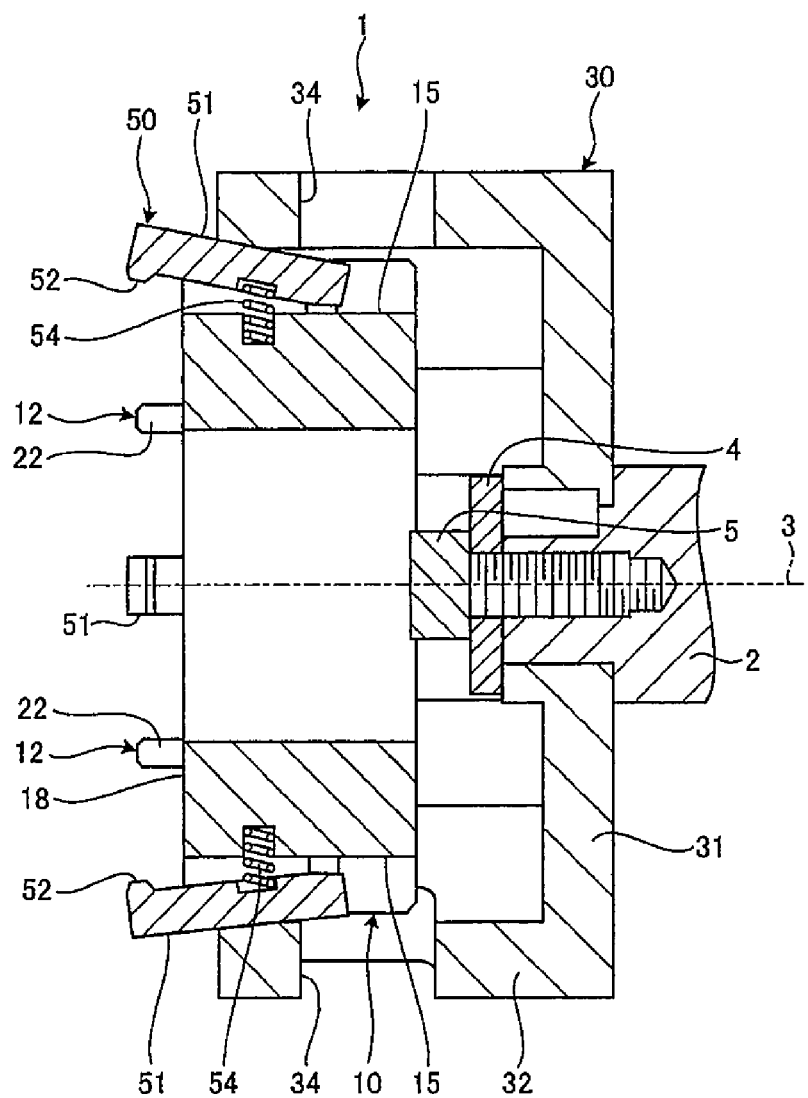
FIG. 8 is a side sectional view of the blade attachment-detachment assisting apparatus depicted in FIG. 7.
Figure 10:
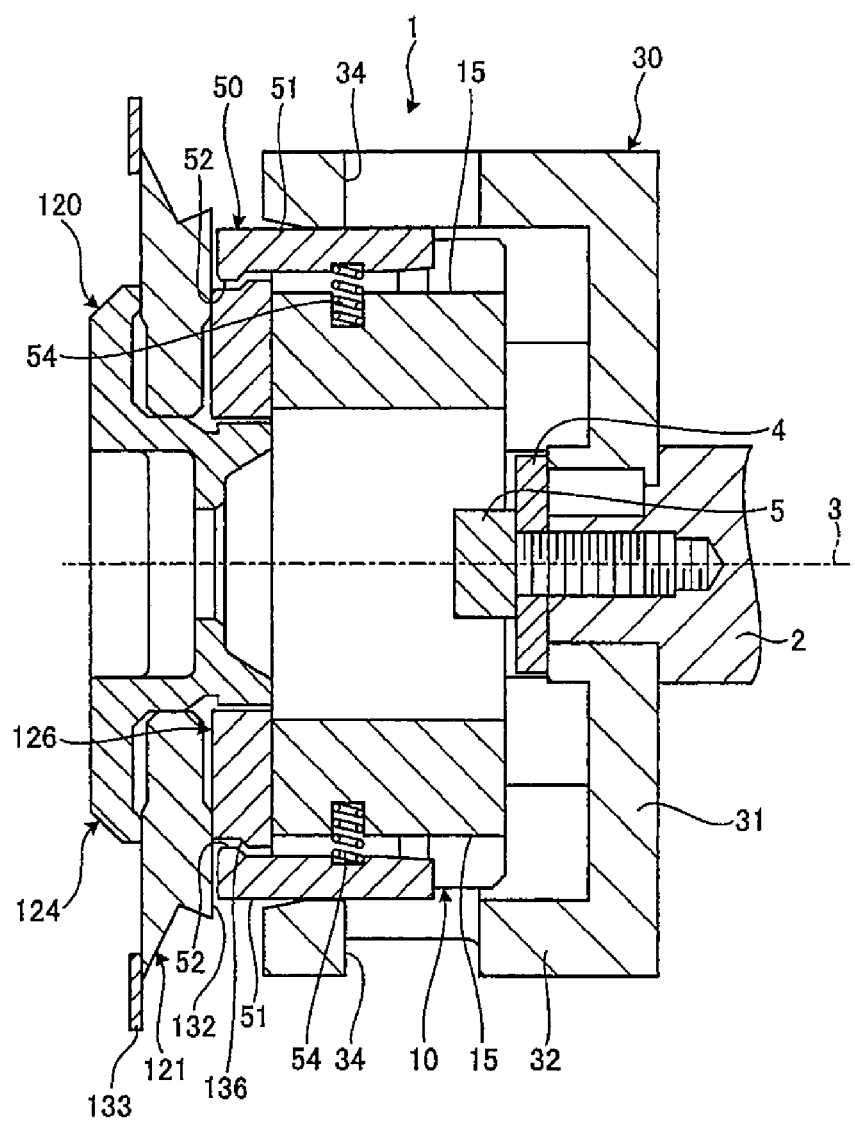
FIG. 10 is a side sectional view of the blade attachment-detachment assisting apparatus and the cutting unit depicted in FIG. 9.
Figure 11:
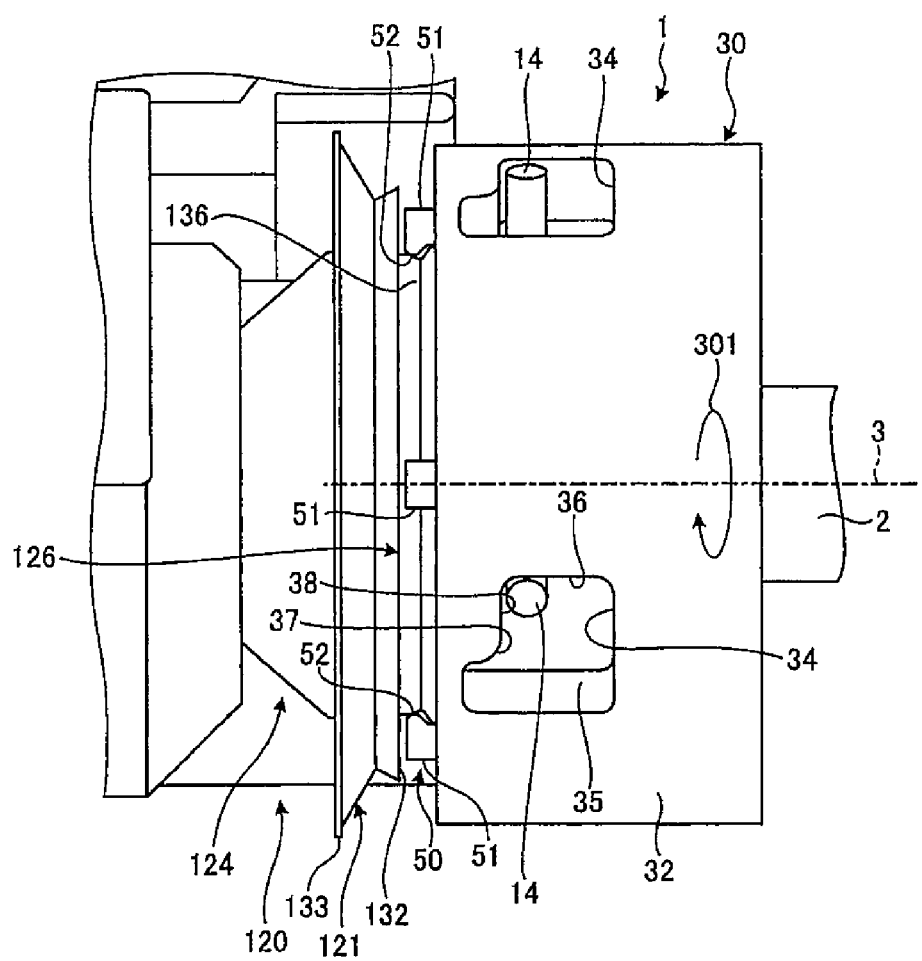
FIG. 11 is a side view depicting the state in which a rotating shaft part and a housing of the blade attachment-detachment assisting apparatus depicted in FIG. 9 have been rotated in one direction.
Figure 12:
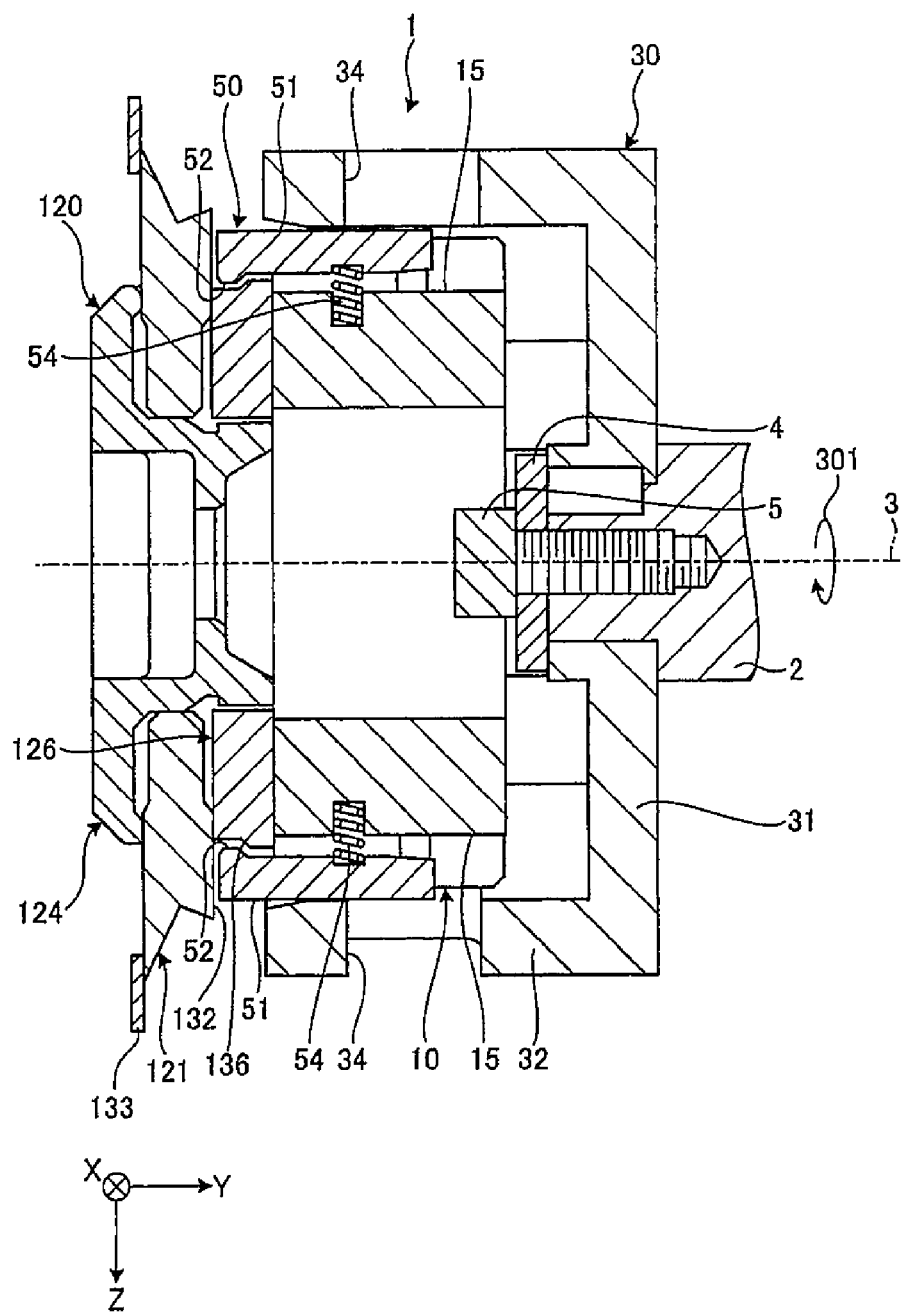
FIG. 12 is a side sectional view of the blade attachment-detachment assisting apparatus and the cutting unit depicted in FIG. 11.
Figure 13:
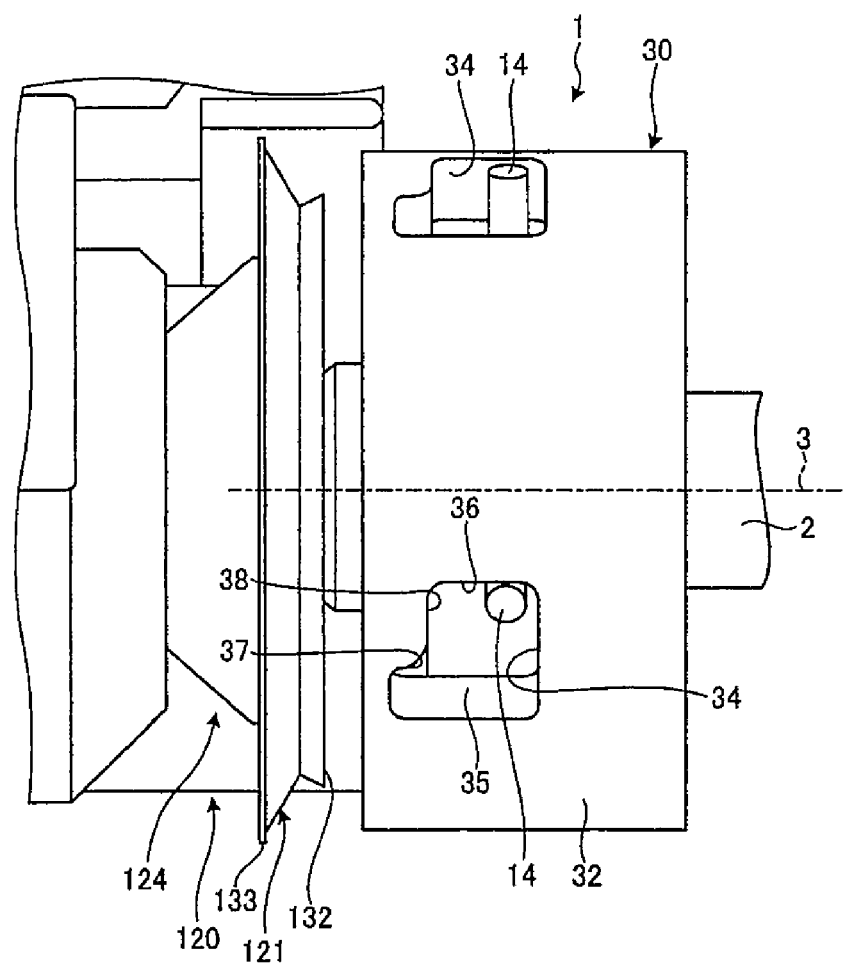
FIG. 13 is a side view depicting the state in which the nut has been removed from the spindle by the blade attachment-detachment assisting apparatus depicted in FIG. 11.
Figure 14:
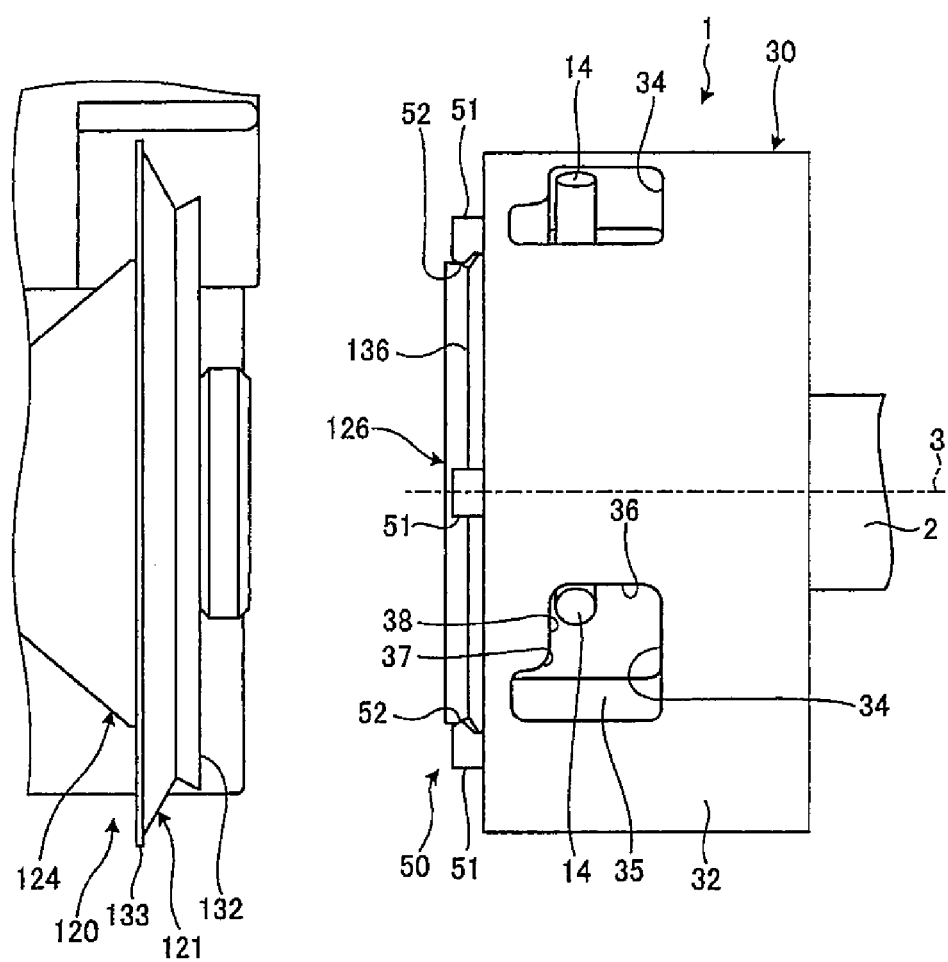
FIG. 14 is a side view depicting the state in which the blade attachment-detachment assisting apparatus depicted in FIG. 13 has been separated from the spindle of the cutting unit.
Figure 15:
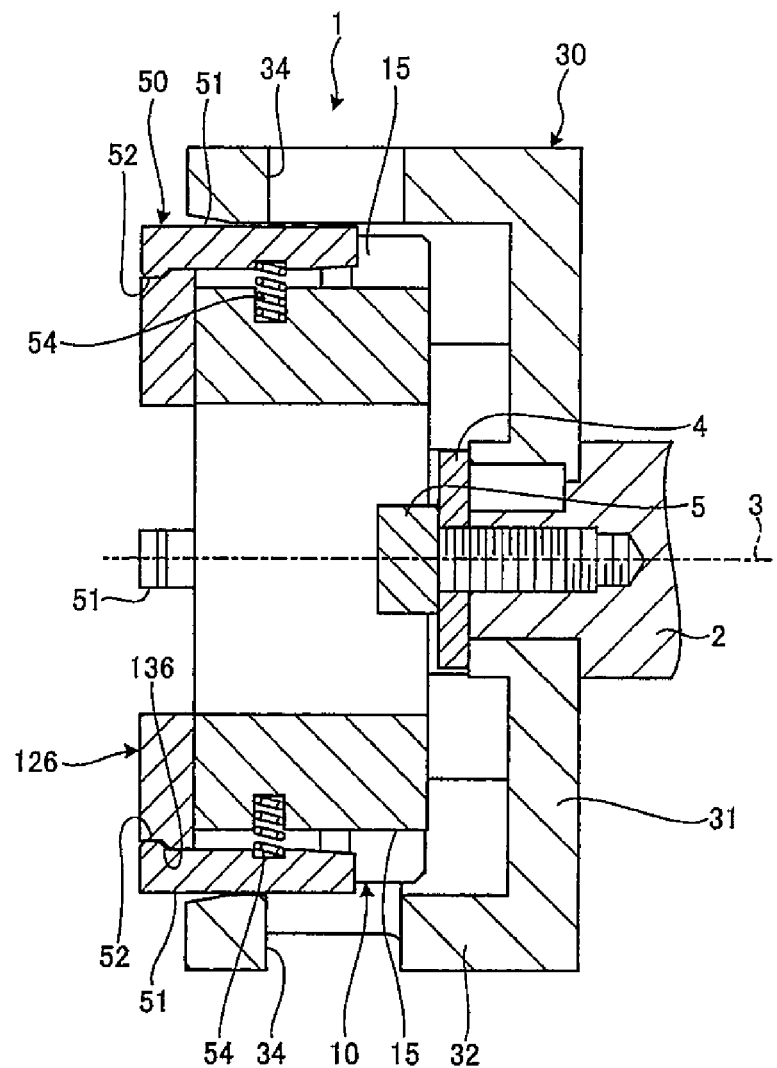
FIG. 15 is a side sectional view of the blade attachment-detachment assisting apparatus depicted in FIG. 14.

Next, the present specification will explain, based on drawings, operation of replacing the cutting blade 121 of the cutting unit 120 by the blade attachment-detachment mechanism 180, i.e. operation of removing the nut 126 from the spindle 123 of the cutting unit 120 by the blade attachment-detachment assisting apparatus 1. FIG. 7 is a side view depicting the state in which the blade attachment-detachment assisting apparatus according to the embodiment is made opposed to the spindle of the cutting unit in the Y-axis direction. FIG. 8 is a side sectional view of the blade attachment-detachment assisting apparatus depicted in FIG. 7. FIG. 9 is a side view depicting the state in which the grip claws of the grip members of the nut grip part of the blade attachment-detachment assisting apparatus depicted in FIG. 7 engage with the annular groove of the nut. FIG. 10 is a side sectional view of the blade attachment-detachment assisting apparatus and the cutting unit depicted in FIG. 9. FIG. 11 is a side view depicting the state in which the rotating shaft part and the housing of the blade attachment-detachment assisting apparatus depicted in FIG. 9 have been rotated in the one direction. FIG. 12 is a side sectional view of the blade attachment-detachment assisting apparatus and the cutting unit depicted in FIG. 11. FIG. 13 is a side view depicting the state in which the nut has been removed from the spindle by the blade attachment-detachment assisting apparatus depicted in FIG. 11. FIG. 14 is a side view depicting the state in which the blade attachment-detachment assisting apparatus depicted in FIG. 13 has been separated from the spindle of the cutting unit. FIG. 15 is a side sectional view of the blade attachment-detachment assisting apparatus depicted in FIG. 14.

When the blade attachment-detachment mechanism 180 replaces the cutting blade 121, the cutting apparatus 100 stops processing operation to the workpiece 200 and supplies the cutting blade 121 from the blade stocker 181 to the other blade chuck 182 corresponding to the cutting unit 120 of the replacement target. Then, the cutting apparatus 100 stops the rotation of the spindle 123 by the motor of the cutting unit 120 of the replacement target and supplies a pressurized gas into the cylinder unit 137 of the rotation stop part 127 to cause the lock member to engage with the lock hole and restrict the rotation of the spindle 123.

The cutting apparatus 100 causes the advancing-retreating unit 183 to move the blade attachment-detachment assisting apparatus 1 corresponding to the cutting unit 120 of the replacement target to a position opposed to the spindle 123 of the cutting unit 120 of the replacement target in the Y-axis direction as depicted in FIG. 7 and FIG. 8. At this time, in the blade attachment-detachment assisting apparatus 1, the drop prevention pins 14 are located in the larger-width parts 35 of the cam holes 34, the nut rotating part 10 is located at the protrusion position, and the grip claws 52 of the grip members 51 of the nut grip part 50 are separate from each other.

In the embodiment, the cutting apparatus 100 brings the cutting unit 120 of the replacement target close to the blade attachment-detachment assisting apparatus 1 along the Y-axis direction. Thereupon, as depicted in FIG. 9 and FIG. 10, the surface 134 of the nut 126 of the cutting unit 120 abuts against the surface 18 of the rotating part main body 11 of the nut rotating part 10. In addition, the drop prevention pins 14 of the nut rotating part 10 are positioned to fixing positions on the base end side relative to the step surfaces 37. Thereupon, the housing 30 presses the grip claws 52 of the grip members 51 of the nut grip part 50 toward the outer circumferential surface of the nut 126, and the grip claws 52 engage with the annular groove 136.

The cutting apparatus 100 rotates the rotating shaft part 2 of the blade attachment-detachment assisting apparatus 1 in the one direction 301, which is the direction that makes the nut 126 loosened, at the fixing position to which the nut rotating part 10 has been pushed by the cutting unit 120. Thereupon, in the cutting apparatus 100, when the housing 30 is rotated in the one direction 301 together with the rotating shaft part 2, the drop prevention pins 14 move in the cam holes 34 and the housing 30 rotates by the predetermined angle relative to the nut rotating part 10, so that the drop prevention pins 14 in a predetermined orientation are positioned to such an orientation as to abut against the inner surface on the side of the other direction 302 as depicted in FIG. 11. In this manner, the drop prevention pins 14 engage with the inside surfaces 38 of the smaller-width parts 36 of the cam holes 34 and the nut rotating part 10 engages with the housing 30, so that advancing and retreating of the nut rotating part 10 in the direction of the axis center 3 relative to the housing 30 are restricted. When the nut rotating part 10 is rotated by the predetermined angle relative to the spindle 123, the pins 22 of the engagement pins 12 pushed by the surface of the nut 126 to be evacuated to the side of the rotating shaft part 2 enter the engagement holes 135 of the nut 126 and engage with them.

As depicted in FIG. 11 and FIG. 12, the cutting apparatus 100 further rotates the rotating shaft part 2 and the housing 30 in the one direction 301. Thereupon, because the nut 126 is screwed to the male screw 130 formed in the mount 124, the screwing of the nut 126 is gradually released and the nut 126 moves along the axis center 3 toward the blade attachment-detachment assisting apparatus 1. This movement of the nut 126 in the axis center direction is set possible based on contraction of the springs 23. After rotating the rotating shaft part 2 and the housing 30 in the one direction 301 until the nut 126 comes off from the male screw 130 of the mount 124 as depicted in FIG. 13, the cutting apparatus 100 stops the rotation of the rotating shaft part 2.

In the embodiment, the cutting apparatus 100 causes the cutting unit 120 of the replacement target to get further away from the blade attachment-detachment assisting apparatus 1 along the Y-axis direction. At this time, as depicted in FIG. 14, the nut rotating part 10 engages with the housing 30. Therefore, as depicted in FIG. 14 and FIG. 15, the nut rotating part 10 is kept at the fixing position, and the state in which the grip claws 52 of the grip members 51 of the nut grip part 50 engage with the annular groove 136 of the nut 126 is kept. In the blade attachment-detachment assisting apparatus 1, as depicted in FIG. 14 and FIG. 15, the state in which the grip claws 52 engage with the annular groove 136 of the nut 126 is kept. At this time, if there is no play regarding the position of the nut 126 in the X-axis direction and the Z-axis direction, thereafter in a step of screwing the nut 126 to the groove of the boss part 128 of the mount 124 again, there is a possibility that the groove and the nut 126 do not mesh with each other well and the screwing fails when the position of the boss part 128 of the mount 124 deviates with respect to the nut 126 even slightly. For this reason, the blade attachment-detachment assisting apparatus 1 sets the positions of the drop prevention pins 14 and the inside surfaces 38 of the cam holes 34 in such a manner that the grip claws 52 are slightly protruded from the housing 30 and are kept at positions at which the grip claws 52 are slightly opened such that the nut 126 held by the grip claws 52 can move in the X-axis direction and the Z-axis direction even slightly.

Furthermore, when rotating the nut 126 gripped by the grip claws 52 and removing the nut 126 from the boss part 128 of the mount 124, the blade attachment-detachment assisting apparatus 1 invariably continues to rotate the nut 126 until the boss part 128 is separated from the nut 126. Conventionally, control in which the nut 126 is rotated by a predetermined number of rotations is employed. However, there is the case in which the male screw 130 of the boss part 128 slightly engages with the screw groove of the nut 126. When the boss part 128 is separated in the slight-engagement state, a situation occurs in which the male screw 130 of the nut 126 gets caught on the screw groove of the boss part 128 and the nut 126 drops off from the grip claws 52. Therefore, in the blade attachment-detachment assisting apparatus 1, control in which rotating the nut 126 is continued until the boss part 128 is separated from the nut 126 is employed.

Then, in the cutting apparatus 100, the one blade chuck 182 of the blade attachment-detachment mechanism 180 removes the cutting blade 121 from the spindle 123 of the cutting unit 120 of the replacement target and then the other blade chuck 182 attaches the cutting blade 121 to the spindle 123 of the cutting unit 120 of the replacement target.

Figure 16:
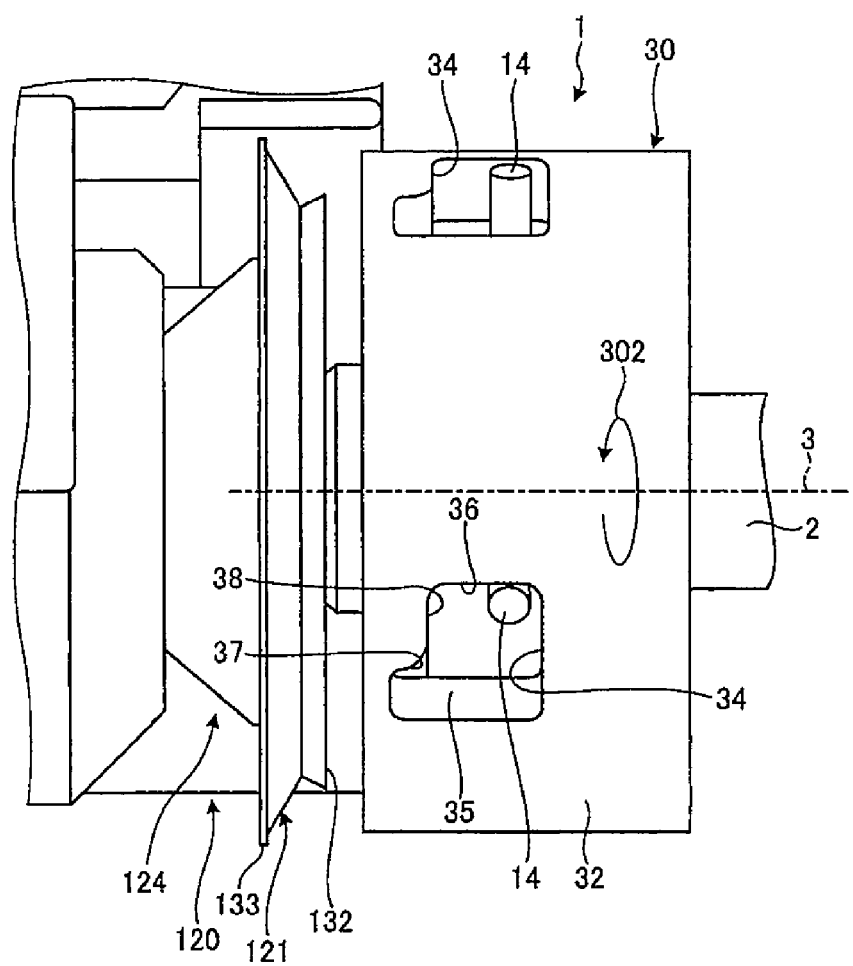
FIG. 16 is a side view depicting the state in which the blade attachment-detachment assisting apparatus according to the embodiment has been made opposed to the spindle of the cutting unit in the Y-axis direction and then the cutting unit has been brought close to the blade attachment-detachment assisting apparatus that grips the nut.
Figure 16:
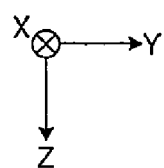
Figure 17:
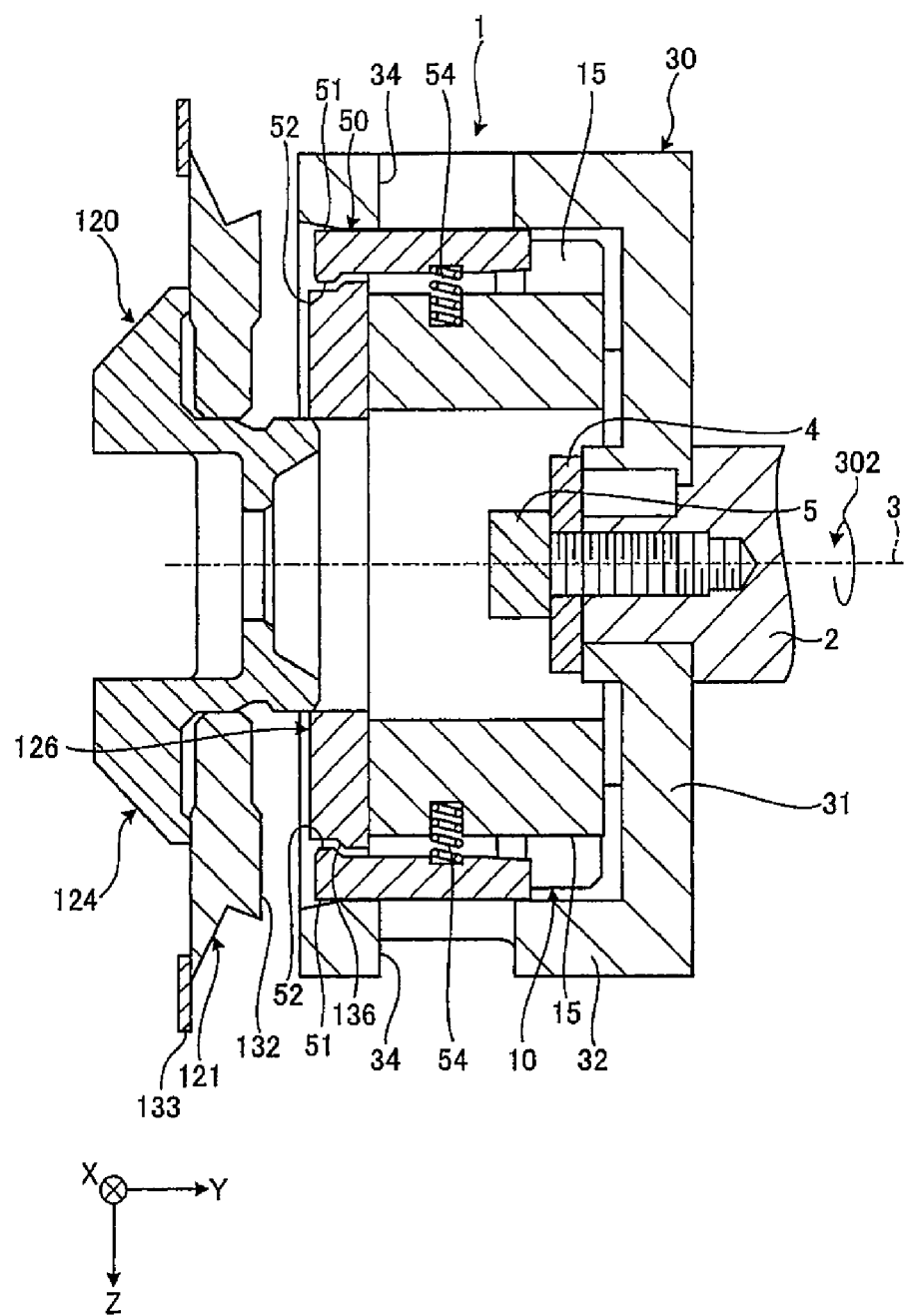
FIG. 17 is a side sectional view of the blade attachment-detachment assisting apparatus and the cutting unit depicted in FIG. 16.
Figure 18:
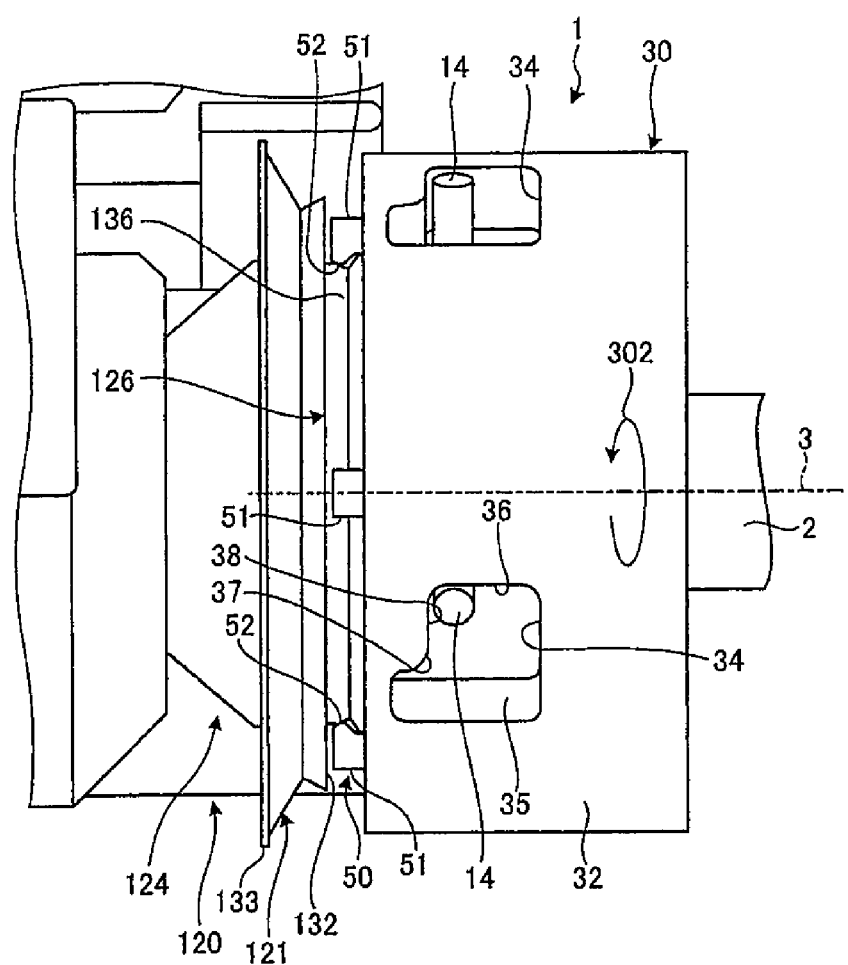
FIG. 18 is a side view depicting the state in which the rotating shaft part and the housing of the blade attachment-detachment assisting apparatus depicted in FIG. 16 have been rotated in the other direction and the nut abuts against the cutting blade.
Figure 19:
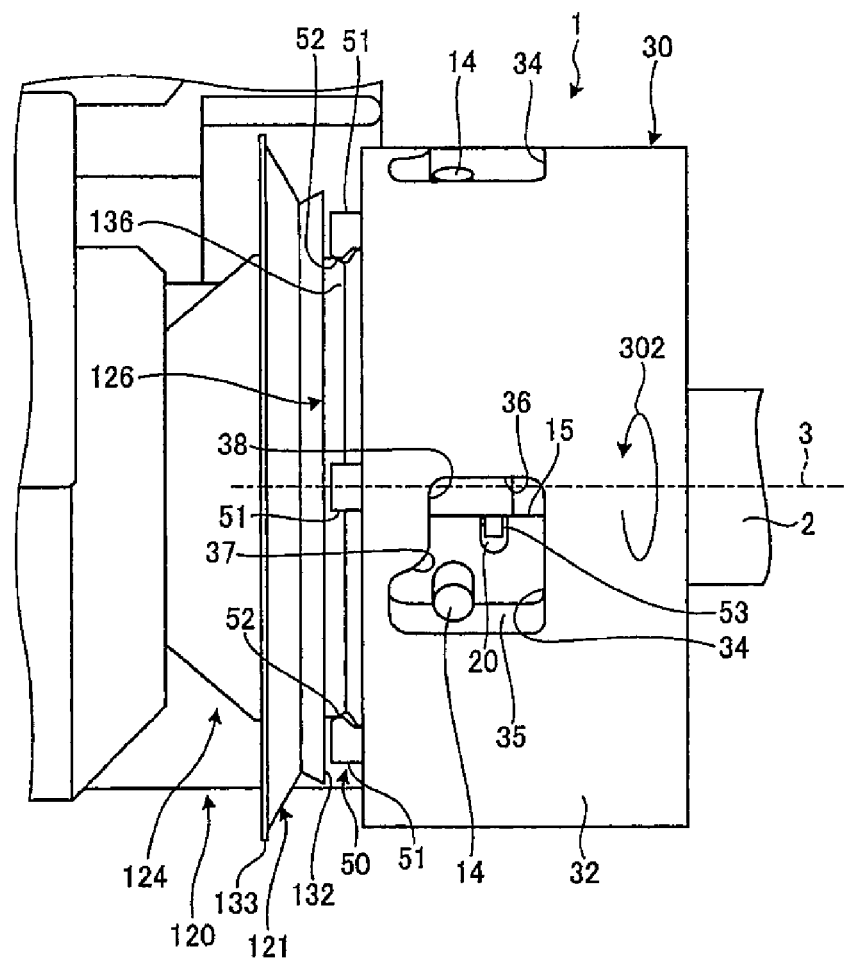
FIG. 19 is a side view depicting the state in which the rotating shaft part and the housing of the blade attachment-detachment assisting apparatus depicted in FIG. 18 have been further rotated in the other direction.
Figure 20:
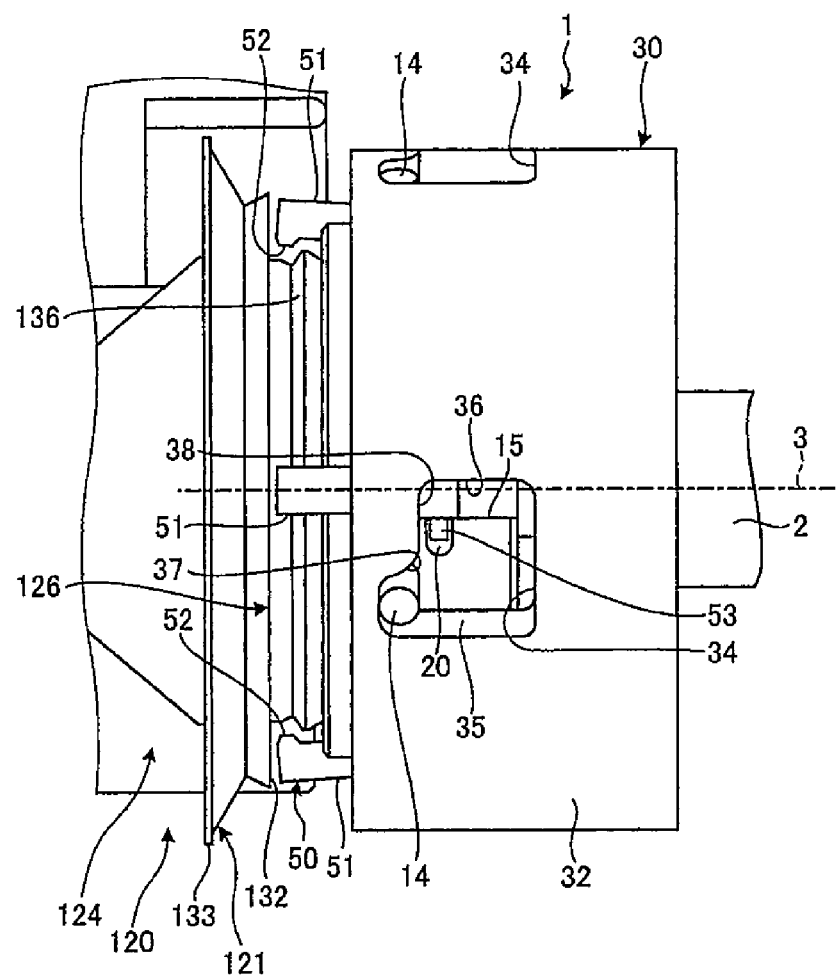
FIG. 20 is a side view depicting the state in which engagement between the grip claws of the grip members of the nut grip part of the blade attachment-detachment assisting apparatus depicted in FIG. 18 and the annular groove of the nut has been released.

Next, the present specification will explain, based on drawings, operation of attaching the nut 126 to the spindle 123 of the cutting unit 120 by the blade attachment-detachment assisting apparatus 1. FIG. 16 is a side view depicting the state in which the blade attachment-detachment assisting apparatus according to the embodiment has been made opposed to the spindle of the cutting unit in the Y-axis direction and then the cutting unit has been brought close to the blade attachment-detachment assisting apparatus that grips the nut. FIG. 17 is a side sectional view of the blade attachment-detachment assisting apparatus and the cutting unit depicted in FIG. 16. FIG. 18 is a side view depicting the state in which the rotating shaft part and the housing of the blade attachment-detachment assisting apparatus depicted in FIG. 16 have been rotated in the other direction and the nut abuts against the cutting blade. FIG. 19 is a side view depicting the state in which the rotating shaft part and the housing of the blade attachment-detachment assisting apparatus depicted in FIG. 18 have been further rotated in the other direction. FIG. 20 is a side view depicting the state in which engagement between the grip claws of the grip members of the nut grip part of the blade attachment-detachment assisting apparatus depicted in FIG. 18 and the annular groove of the nut has been released.

The cutting apparatus 100 causes the advancing-retreating unit 183 to move the blade attachment-detachment assisting apparatus 1 corresponding to the cutting unit 120 of the replacement target to a position opposed to the spindle 123 of the cutting unit 120 of the replacement target in the Y-axis direction. Thereafter, the cutting apparatus 100 brings the cutting unit 120 of the replacement target close to the blade attachment-detachment assisting apparatus 1 along the Y-axis direction and, as depicted in FIG. 16 and FIG. 17, presses the nut 126 gripped by the blade attachment-detachment assisting apparatus 1 in the Y-axis direction by the mount 124. The cutting apparatus 100 rotates the rotating shaft part 2 of the blade attachment-detachment assisting apparatus 1 in the other direction 302, which is the direction that makes the nut 126 fastened. Thereupon, because the pins 22 of the engagement pins 12 engage with the engagement holes 135 of the nut 126, the nut 126 rotates in the other direction 302 together with the rotating shaft part 2 and the housing 30.

Thereupon, the male screw 130 formed in the mount 124 screws to the inner circumferential surface of the nut 126 gripped by the nut grip part 50 of the blade attachment-detachment assisting apparatus 1, and the nut 126 gradually comes close to the circular base 132 of the cutting blade 121 attached to the cutting unit 120. Thereafter, as depicted in FIG. 18, the nut 126 abuts against the circular base 132 of the cutting blade 121, and the cutting apparatus 100 further rotates the rotating shaft part 2 and the housing 30 in the other direction 302.

In this case, because the nut 126 abuts against the circular base 132 of the cutting blade 121 and rotation of the nut 126 is restricted, when the engagement pins 12 of the blade attachment-detachment assisting apparatus 1 rotate around the axis center 3, the rotation of the nut rotating part 10 stops while the housing 30 rotates in the other direction 302 by the predetermined angle because the pins 22 engage with the engagement holes 135. When the housing 30 rotates in the other direction 302 by the predetermined angle, as depicted in FIG. 19, the cutting apparatus 100 causes the drop prevention pins 14 to abut against the inner surfaces of the cam holes 34 on the side of the one direction 301 and be located in the larger-width parts 35. Thereafter, the cutting apparatus 100 stops the rotation of the rotating shaft part 2 and the housing 30 in the other direction 302.

In the embodiment, as depicted in FIG. 20, the cutting apparatus 100 causes the cutting unit 120 of the replacement target to get further away from the blade attachment-detachment assisting apparatus 1 along the Y-axis direction. Thereupon, because the drop prevention pins 14 abut against the inner surfaces of the cam holes 34 and are located in the larger-width parts 35, the nut rotating part 10 is pressed by the biasing force of the springs 23 and moves toward the protrusion position. In the cutting apparatus 100, the nut rotating part 10 is located at the protrusion position and the engagement of the grip claws 52 of the grip members 51 of the nut grip part 50 with the annular groove 136 is released.

The cutting apparatus 100 moves the two blade chucks 182 and the blade attachment-detachment assisting apparatus 1 to a position further away from the carry-in/out region than the processing region. Thereafter, the cutting apparatus 100 stops the supply of the pressurized gas into the cylinder unit 137 of the rotation stop part 127 to release the engagement of the lock member with the lock hole, and executes other operations. Then, the cutting apparatus 100 resumes the processing operation to the workpiece 200.

The blade attachment-detachment assisting apparatus 1 according to the embodiment includes the nut rotating part 10 including the engagement pins 12 that engage with the engagement holes 135 of the nut 126, the nut grip part 50 that is disposed on the nut rotating part 10 and grips the annular groove 136 of the nut 126, and the housing 30 that surrounds the nut rotating part 10. In the blade attachment-detachment assisting apparatus 1, the nut rotating part 10 is disposed to be capable of advancing and retreating between the protrusion position at which the nut grip part 50 can be attached to and detached from the annular groove 136 of the nut 126 and the fixing position at which the nut grip part 50 is housed in the housing 30 and the engagement between the nut grip part 50 and the nut 126 is kept. In addition, the blade attachment-detachment assisting apparatus 1 includes the springs 23 that bias the nut rotating part 10 toward the protrusion position.

For this reason, in the blade attachment-detachment assisting apparatus 1, through pressing of the nut rotating part 10 by the nut 126 against the biasing force of the springs 23, the nut grip part 50 engages with the annular groove 136 of the nut 126 and the engagement pins 12 engage with the engagement holes 135 through only rotating, so that the nut 126 can be rotated. Furthermore, the blade attachment-detachment assisting apparatus 1 includes the lock mechanism 60 by which the grip claws 52 of the grip members 51 of the nut grip part 50 are fixed in the state of gripping the nut 126. As a result, the blade attachment-detachment assisting apparatus 1 can execute gripping by the nut grip part 50 and advancing and retreating of the housing 30 relative to the nut rotating part 10 without disposing a cylinder or the like that moves the housing 30. Thus, the blade attachment-detachment assisting apparatus 1 provides an effect of enabling automatic attachment and detachment of the nut 126 while intending reduction in the cost.

Furthermore, the nut rotating part 10 is loosely fitted to the housing 30 and is tiltably supported. Therefore, the nut 126 can be gripped by the grip claws 52 even when the axis center 3 of the blade attachment-detachment assisting apparatus 1 is tilted with respect to the axis center of the spindle 123. Due to this, the blade attachment-detachment assisting apparatus 1 eliminates the need for precise axis center alignment with the axis center of the spindle 123 and enables lowering of the degree of proficiency in assembling the cutting apparatus 100 and the blade attachment-detachment mechanism 180.

Modification Example

Figure 21:
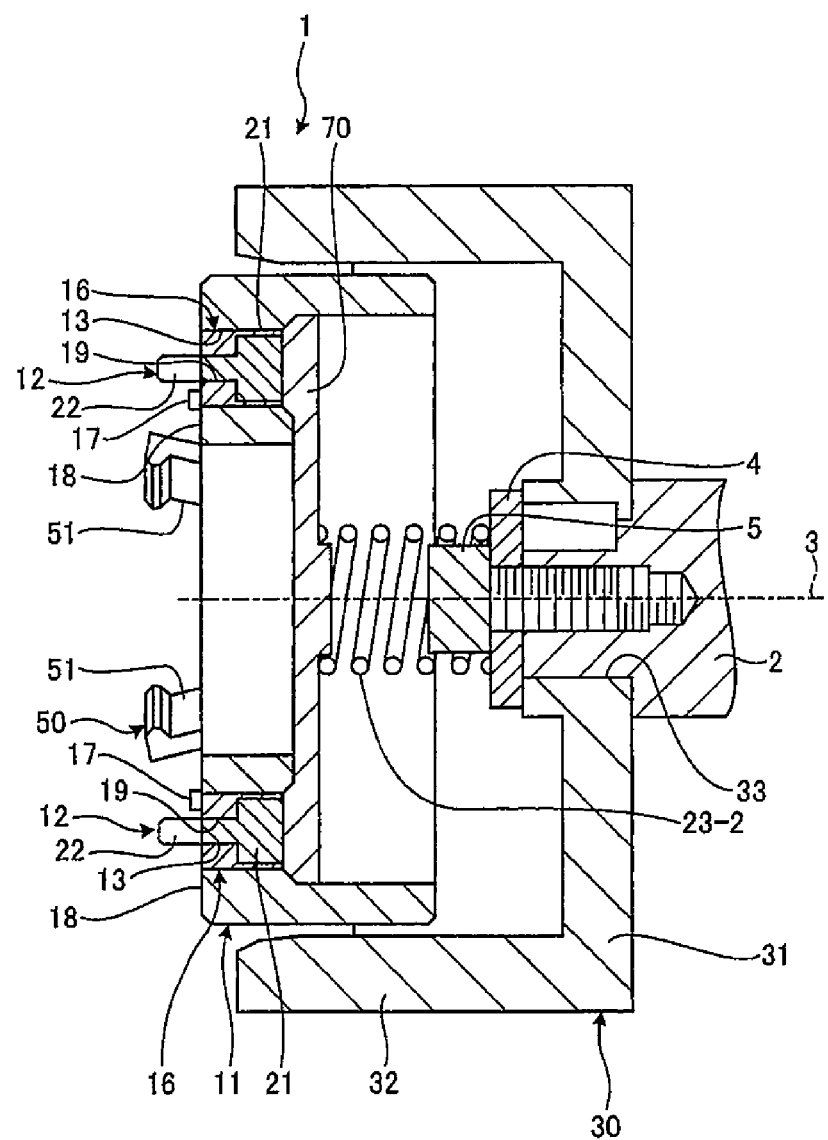
FIG. 21 is a sectional view of a blade attachment-detachment assisting apparatus according to a modification example of the embodiment.

A blade attachment-detachment assisting apparatus according to a modification example of the embodiment of the present invention will be described based on a drawing. FIG. 21 is a sectional view of the blade attachment-detachment assisting apparatus according to the modification example of the embodiment. In FIG. 21, the same part as the embodiment is given the same reference sign and description thereof is omitted.

As depicted in FIG. 21, a blade attachment-detachment assisting apparatus 1 according to the modification example of the embodiment is substantially equal to the embodiment in the configuration except for that a spring 23-2 that is an elastic member that biases the nut rotating part 10 toward the outside of the housing 30 along the axis center 3 is disposed between the washer 4 and a circular-disc-shaped support plate 70 with an outer edge part to which the engagement pins 12 are attached. The support plate 70 and the spring 23-2 are disposed at such a position as to be coaxial with the rotating shaft part 2 and so forth. Thus, the nut rotating part 10 is supported by the rotating shaft part 2 tiltably based on the spring 23-2 with the intermediary of the support plate 70 and the washer 4.

Similarly to the embodiment, the blade attachment-detachment assisting apparatus 1 according to the modification example of the embodiment can execute gripping by the nut grip part 50 and advancing and retreating of the housing 30 relative to the nut rotating part 10 without disposing a cylinder or the like that moves the housing 30. Thus, the blade attachment-detachment assisting apparatus 1 provides an effect of enabling automatic attachment and detachment of the nut 126 while intending reduction in the cost similarly to the embodiment.

The present invention is not limited to the above-described embodiment and modification example. That is, the present invention can be carried out with various modifications without departing from the gist of the present invention. For example, in the present invention, the blade attachment-detachment mechanism 180 may be set at a place other than the position that is on the back surface side in FIG. 2 and is further away from the carry-in/out region than the processing region, and it suffices that the blade attachment-detachment mechanism 180 is set to move to a position opposed to the spindle 123 when the cutting blade 121 is attached and detached.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A blade attachment-detachment assisting apparatus used for a cutting apparatus including a cutting blade mounted to a spindle, a nut for fixing the cutting blade to the spindle, and a rotation stop part that restricts rotation of the spindle, the blade attachment-detachment assisting apparatus comprising:
   a nut rotating part having an engaging part that engages with an engaged part of a surface of the nut;
   a nut grip part that is disposed on the nut rotating part and grips an outer circumferential part of the nut;
   a housing that surrounds the nut rotating part while supporting the nut rotating part rotatably by a predetermined angle; and
   a lock mechanism that keeps a state in which the nut grip part engages with the outer circumferential part of the nut, wherein:
   the nut rotating part is disposed to be capable of advancing and retreating, relative to the housing, to a protrusion position at which the nut grip part is allowed to be attached to and detached from the outer circumferential part of the nut and a fixing position at which the nut grip part is housed in the housing and engagement between the nut grip part and the nut is kept,
   the nut rotating part is fixed to the housing with intermediary of a biasing part that pushes out the nut rotating part to the protrusion position, and
   the lock mechanism includes a protrusion restricting part by which advancing and retreating of the nut rotating part are restricted through engagement of the nut rotating part with the housing when the housing is rotated in a direction that makes the nut loosened and the housing rotates relative to the nut rotating part to be positioned in a predetermined orientation at the fixing position to which the nut rotating part has been pushed.

2. The blade attachment-detachment assisting apparatus according to claim 1, wherein:
   the nut rotating part is loosely fitted to the housing and is supported by a rotating shaft part.

3. The blade attachment-detachment assisting apparatus according to claim 1, wherein:
   the engaged part of the surface of the nut is an engagement hole, the engaging part of the nut rotating part is an engagement pin, and the engagement pin is disposed to be capable of advancing and retreating in a direction that makes engagement.

4. The blade attachment-detachment assisting apparatus according to claim 1, wherein:
   the blade attachment-detachment assisting apparatus is fixed to an advancing-retreating unit that advances and retreats relative to the spindle of the cutting apparatus, together with a blade holding part that holds the cutting blade fixed to the spindle.

5. The blade attachment-detachment assisting apparatus according to claim 1, wherein:

the nut rotating part is loosely fitted to the housing and is supported by an elastic member in a tiltable manner.

* * * * *